(12) United States Patent
Kuo et al.

(10) Patent No.: US 8,368,857 B2
(45) Date of Patent: Feb. 5, 2013

(54) OPTICAL FILM

(75) Inventors: Hui-Lung Kuo, Hsinchu (TW);
Mei-Chih Peng, Hsinchu (TW);
Pin-Chen Chen, Hsinchu (TW);
Ying-Jui Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 516 days.

(21) Appl. No.: 12/583,301

(22) Filed: Aug. 18, 2009

(65) Prior Publication Data

US 2010/0177266 A1    Jul. 15, 2010

(30) Foreign Application Priority Data

Jan. 13, 2009    (TW) .............................. 98101003 A

(51) Int. Cl.
*G02F 1/1333*    (2006.01)
(52) U.S. Cl. ........................................................ 349/115
(58) Field of Classification Search ................... 349/115
See application file for complete search history.

(56) References Cited

U.S. PATENT DOCUMENTS

| | | | |
|---|---|---|---|
| 5,136,480 A | 8/1992 | Pristash et al. | |
| 5,467,417 A | 11/1995 | Nakamura et al. | |
| 5,506,704 A | 4/1996 | Broer et al. | |
| 5,691,789 A | 11/1997 | Li et al. | |
| 5,919,551 A | 7/1999 | Cobb, Jr. et al. | |
| 6,016,177 A | 1/2000 | Motomura et al. | |
| 6,057,008 A | 5/2000 | Schwalb et al. | |
| 6,071,438 A | 6/2000 | Leigeber et al. | |
| 6,099,758 A | 8/2000 | Verall et al. | |
| 2001/0003473 A1* | 6/2001 | Galabova et al. | 349/98 |
| 2006/0119783 A1* | 6/2006 | Fukuoka et al. | 349/176 |
| 2010/0045909 A1* | 2/2010 | Shutou et al. | 349/118 |

FOREIGN PATENT DOCUMENTS

| | | |
|---|---|---|
| CN | 1540411 A | 10/2004 |
| CN | 101140719 A | 1/2008 |
| TW | 494258 B | 7/2002 |
| TW | 200422662 | 11/2004 |
| TW | 200515038 | 5/2005 |

* cited by examiner

*Primary Examiner* — Phu Vu
(74) *Attorney, Agent, or Firm* — Muncy, Geissler, Olds & Lowe, PLLC

(57) ABSTRACT

The present invention provides an optical film with functions of light collimating, light polarization for brightness enhancement and limiting viewing angle and a method for preparing the same. The optical film includes a plurality of layers of a cholesteric liquid crystal film bound together via an optical adhesive and a quarter-wavelength retardation plate bound with the cholesteric liquid crystal film via the optical adhesive. Therein, at least one layer of the cholesteric liquid crystal film has a polarized separated wavelength range covering the wavelength range of visible light of three primary colors of red, green and blue.

7 Claims, 25 Drawing Sheets
(16 of 25 Drawing Sheet(s) Filed in Color)

OPTICAL FILM

BACKGROUND OF THE INVENTION

1. Field of the Invention

The present invention relates to an optical film with functions of light polarization, light collimating and limiting viewing angle for a liquid crystal display.

2. Description of Related Art

In current LCD (Liquid Crystal Display) technology, only 4-6% of the total luminance provided by back light source is escaped from the viewing side of a panel. The low light energy efficiency is mostly caused by the LCD elements of color filters and dichroic polarizers. Especially, the element of polarizer, in principle, absorbs half of the light energy that provided by back light unit of a LCD. However, there's still room for improving the light efficiency by changing the polarizer materials.

Accordingly, many solutions were proposed to solve this problem. One of the most efficient way is using a reflective polarizer which can recycle and reuse the polarized light which was supposed to be absorbed by a polarizer. On the other hand, some displays mainly for personal use such as notebook computers, mobile phones, desktop monitors, ATM machine, and so on, do not require large viewing angle but they need privacy, still require brightness enhancement. Therefore, for those applications, it is only necessary to enhance brightness around the center of the displays with small viewing angle and are currently achieved by using a special collimating film with specific structures thereon, for example, Lumisty® film (Sumitomo Chemistry Inc).

To achieve functions of light polarization, light collimating and limiting viewing angle for a liquid crystal display at the same time, it is used to apply many films to collect all those functions. The present invention intends to achieve all the functions by using only one piece of new optical film.

A novel way to polarize light for enhancing brightness is to utilize a reflective cholesteric liquid crystal film. Therein, non-polarized incident white light is separated into left and right circularly polarized light through the optical chirality and the helical molecular structure of cholesteric liquid crystals. 50% of the circularly polarized light having opposite chirality is transmitted, while the other 50% having the same chirality is reflected by the cholesteric liquid crystal film. The reflected light can be re-directed into the panel by the layers of back light unit. Theoretically, all the light from a back light unit can be transformed into one of the circular polarized light. It is kind of lossless during this light polarization step. Furthermore, a quarter-wavelength retardation plate can be used to transform circularly polarized light into linearly polarized light and its polarization axis is possible to be arranged at the same angle of the dichroic polarizer. Therefore, all of the light is able to pass through the dichroism polarizer, thereby the brightness is extremely enhanced.

Conventionally, the light enhancing film made by cholesteric liquid crystals comprises a single layer or multiple layers. No matter how many layers it has, the selected reflection range (or polarization separation range) of the final product should cover the wavelength of visible light range, especially, the wavelength of the three primary colors of red, green and blue.

The method for preparing a single layer of cholesteric liquid crystal film is disclosed in, e.g. U.S. Pat. Nos. 5,506, 704, 5,691,789, 6,099,758, 6,057,008, and 6,071,438. In order to vary the helical pitch of cholesteric liquid crystals, most of these methods utilize long time exposure under low illuminance, difference of reactivity, or further addition of certain dyes, so as to make the effective range of reflective wavelength cover majority of the wavelength of visible light.

One can also make broadband cholesteric liquid crystal layers by multilayer methods. Since the wavelength range of a common single layer of a cholesteric liquid crystal film is limited, a plurality of layers of a cholesteric liquid crystal film are prepared by coating multiple times such that the wavelength range of each layer can be combined together so as to cover the whole wavelength range of visible light. For example, U.S. Pat. No. 6,016,177 discloses a plurality of layers of a cholesteric liquid crystal film formed by coating a plurality of layers of cholesteric liquid crystal polymers having different helical pitches on a substrate. The property of such films is that the cholesteric liquid crystal layer is directly coated in a layer-by-layer manner, and the alignment of next layer is done by the previously aligned layer. However, to prepare cholesteric liquid crystal layers by directly multilayer coating method has many drawbacks. Firstly, there are multiple alignment interferences occurring between the layers which will adversely affects the polarizing effect. Secondly, the coating process has to be operated under restrictive conditions, for example, the surface tension of each layer should be precisely controlled to prevent the coating defects. Furthermore, the performance of the final film product is highly susceptible to the process temperature.

In addition, the method for enhancing brightness of a liquid crystal display within small viewing angle, i.e. the well-known "light collimating" technique, is disclosed in U.S. Pat. Nos. 5,136,480 (1992), 5,467,417 (1995), and 5,919,551 (1999). The method involves forming a microstructure on a general transparent polymer film or plate such that light with large incident angle can be guided to the central viewing angle area of the liquid crystal display, thereby the brightness at the central viewing angle area is quite enhancing. However, such approach only relates to light collimating but not light polarization. More than half of the light will still be lost when light transmitted through a polarizing film at the next station on the way to LCD panel. And actually, the total brightness is not enhanced at all due to the additional layers of films and the total reflection. Therefore, although the central viewing angle area of the liquid crystal display looks brighter, the total light transmittance is actually lowered.

The present invention has been carefully studied. It provides an optical film comprising a cholesteric liquid crystal film, which comprises cholesteric liquid crystal layers and by specific combination thereof, the resulting integrated optical film can simultaneously achieve functions of light collimating, light polarization for enhancing brightness and limiting viewing angle.

SUMMARY OF THE INVENTION

To overcome the drawbacks in the prior art, the present invention provides an optical film, which comprises: a plurality of layers of a cholesteric liquid crystal film having a first surface and an opposed second surface; an optical adhesive formed between the cholesteric liquid crystal layers; and a quarter-wavelength retardation plate formed on the first surface of the cholesteric liquid crystal film, wherein at least one layer of the cholesteric liquid crystal film has a light polarization separation wavelength range covering the wavelength range of visible light of three primary colors of red, green and blue, and the quarter-wavelength retardation plate is bound to the cholesteric liquid crystal film via the optical adhesive. More specifically, at least one layer of the cholesteric liquid crystal film separates out circularly polarized light having the wavelength range of 450 nm to 700 nm.

In an embodiment of the present invention, the optical film further comprises a substrate bound to the second surface of the cholesteric liquid crystal film.

In another embodiment of the present invention, the cholesteric liquid crystal film separates circularly polarized light having the wavelength ranging from 400 nm to 700 nm or from 450 nm to 700 nm.

The present invention further provides a method for preparing the optical film, which comprises the steps of: (a) providing a first cholesteric liquid crystal layer and a second cholesteric liquid crystal layer; (b) binding the second cholesteric liquid crystal layer with the first cholesteric liquid crystal layer via an optical adhesive; thus the resulting a laminated cholesteric liquid crystal film having a first surface and an opposed second surface; (c) binding a quarter-wavelength retardation plate to the first surface of the cholesteric liquid crystal film via the optical adhesive, wherein at least one layer of the cholesteric liquid crystal film has a polarized separated wavelength range covering the wavelength range of visible light of three primary colors of red, green and blue. More specifically, the cholesteric liquid crystal film separates circularly polarized light having the wavelength ranging from 450 nm to 700 nm. Actually, the cholesteric liquid crystal layers and the optical adhesive layers can be alternately laminated and the number of layers is basically not limited.

In an embodiment, at the step (b), a third cholesteric liquid crystal layer is provided and bound to the second cholesteric liquid crystal layer via the optical adhesive, thus the resulting laminated cholesteric liquid crystal film having a first surface and an opposed third surface. Moreover, a basement substrate is provided at step (a) such that one of the first and second cholesteric liquid crystal layers is formed on a surface of the substrate.

Although the number of layers built within the cholesteric liquid crystal film is not limited, there should be at least one "broad-range" cholesteric liquid crystal layer in the film, namely, its reflection wavelength range (or polarized separated wavelength range) covers the main wavelength range of visible light of three primary colors of red, green and blue. The film may be made of a single layer of cholesteric liquid crystals or a plurality of layers of cholesteric liquid crystals, as long as the reflection wavelength range of each layer can be combined to cover the wavelength range of visible light of three primary colors of red, green and blue.

In an embodiment, the laminated cholesteric liquid crystal film of the optical film according to the present invention may be composed of two aforementioned wide-range cholesteric liquid crystal layers, or composed of a wide-range cholesteric liquid crystal layer and a narrow-range cholesteric liquid crystal layer. The "narrow-range" means that the selected reflection wavelength of the film only covers a portion of the main wavelength range of visible light of three primary colors of red, green and blue.

In another embodiment, the optical film has a multi-layer structure, wherein the number of layers of wide-range cholesteric liquid crystal layers and the number of layers of narrow-range cholesteric liquid crystal layers are not limited to one.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

Figure 1A:
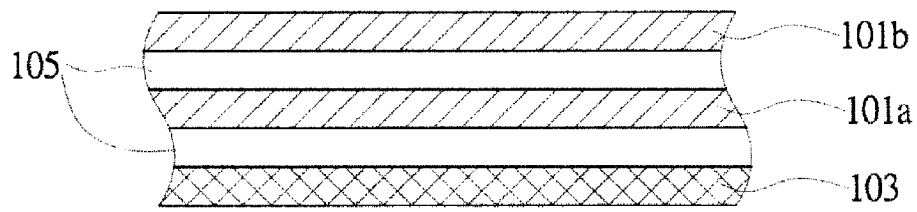
FIG. 1A is a schematic diagram showing the structure of an optical film having two layers of the cholesteric liquid crystal film according to the present invention.

The specific embodiments are to be described to illustrate the present invention. Those skilled in the art can readily appreciate these and other advantages or effects of the present invention after reading the disclosure in the specification.

The term "cholesteric liquid crystal" or "liquid crystal material" refer to liquid crystal monomer, oligomer or polymer with a polymerizable functional group. The term "cholesteric liquid crystal layer" or "single layer of cholesteric liquid crystal polymer layer" refer to cross-linked cholesteric liquid crystals or liquid crystal materials. The term "polymer" refers to homopolymer, copolymer and polymer blend.

In the present invention, the cholesteric liquid crystal is a cholesteric liquid crystal having a polymerizable functional group. More specifically, the cholesteric liquid crystal is, but not limited to, a single cholesteric liquid crystal compound having a polymerizable functional group, a polymerizable nematic liquid crystal mixed with a chiral dopant, a mixture of a cholesteric liquid crystal having a polymerizable functional group and a nematic liquid crystal having a polymerizable functional group, or any combination thereof. At the step of cross-linking by radiation, electron beam or heating may be alternatively employed. After the step of cross-linking, the cholesteric liquid crystal is solidified so as to minimize the correlation between temperature and helical pitch.

The cholestric liquid crystal mentioned above is available from commercial source. For example, the cholesteric liquid crystal can be a mixture of No. 242 and/or No. 1057 with a chiral dopant No. 756 from BASF; or one of HELISOL®0142R, 0250R and 0359R from Wacker Chemical.; or a reactive cholesteric liquid crystal mixture (also called as a polymerizable cholesteric liquid crystal mixture) made of any reactive liquid crystal mixture or monomer having a nematic liquid crystal property with a proper amount of chiral dopant such as R-811, S-811, R-1011, or S-1011 added thereto.

In the helix structure of the cholesteric liquid crystal, the helical pitch (p) of the cholesteric liquid crystal is the distance when the molecular director complete one helix turn through the thickness of the film. The helical pitch is a feature of the cholesteric liquid crystal, and it can be used to evaluate the position ($\lambda$) and width ($\Delta\lambda$) of the selective reflection wavelength, as shown in the following formulas:

$$\lambda = n \cdot p$$

$$\Delta\lambda = \Delta n \cdot p$$

wherein n is an average index of refraction of the cholesteric liquid crystal, $\Delta n$ is the birefringency, and $\Delta\lambda$ is the selective reflection wavelength range of the cholesteric liquid crystal. In general condition, the value of $\Delta\lambda$ is around tens of nanometers. The one-layer cholesteric liquid crystal film having larger $\Delta\lambda$, can be made by controlling the temperature during the manufacturing process, or by special methods, e.g. the methods disclosed in U.S. Pat. Nos. 6,669,999, 5,506,704 and 5,691,789.

According to one aspect of the present invention, the optical film may comprise a substrate for supporting a plurality of layers of a cholesteric liquid crystal film. More specifically, for an optical film comprising a plurality of layers of cholesteric liquid crystal film having a first surface and an opposed second surface, the substrate is bound to any one of the two surfaces. The substrate is made of a transparent material such as a glass substrate, a plastic substrate, or an organic-inorganic mixed substrate. More specifically, the substrate is made of, but not limited to, triacetate fiber (TAC), polyethelyne (PE), polypropylene (PP), polyethylene terephthalate (PET), polyether sulfone (PES), polystyrene (PS), polycarbonates (PC), polymethacrylate (PMMA), ARTON, ZEON and so on.

According to another aspect of the present invention, there is no limit on the number of layers to build the final cholesteric liquid crystal film. However, the optical film needs to comprise at least one layer of "wide-range" cholesteric liquid crystal layer, namely, its selective reflection wavelength range covers the main wavelength range of visible light of three primary colors of red, green and blue. The film may be made of a single layer of cholesteric liquid crystal, or made of a plurality of layers of cholesteric liquid crystals. In a preferred embodiment, the optical film comprises two to five layers of cholesteric liquid crystal layers in a cholesteric liquid crystal film. In another embodiment, the optical film of the present invention comprises two or three layers of a cholesteric liquid crystal film.

Figure 1B:
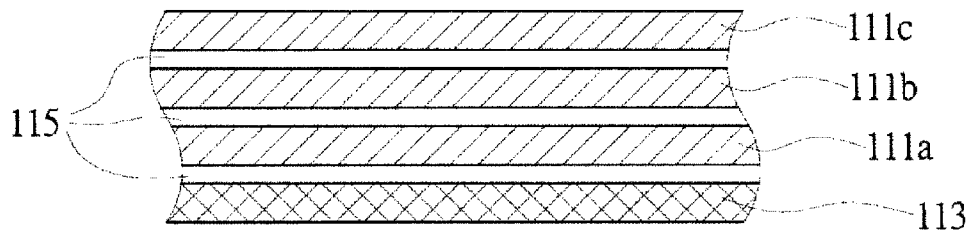
FIG. 1B is schematic diagram showing the structure of an optical film having three layers of the cholesteric liquid crystal film according to the present invention.

FIG. 1A shows an optical film having two layers of a cholesteric liquid crystal film 101 according to the present invention. The layers 101a and 101b in the cholesteric liquid crystal film 101 are bound together via an optical adhesive 105. A quarter-wavelength retardation plate 103 is further bound to a surface of the cholesteric liquid crystal film 101 via the optical adhesive 105. FIG. 1B shows another optical film having three layers of cholesteric liquid crystal film 111 according to the present invention. The layers of the cholesteric liquid crystal film 111 are bound together via an optical adhesive 115, and a quarter-wavelength retardation plate 113 is further bound to a surface of the cholesteric liquid crystal film 111 via the optical adhesive 115.

According to an embodiment of the present invention, the plurality of layers of the cholesteric liquid crystal film can separate left and right circularly polarized light having the wavelength ranging from 450 nm to 700 nm. Namely, the cholesteric liquid crystal film can separate the left and right circularly polarized light in this range that is transmitted through the optical film of the present invention. In one embodiment, the plurality of layers of the cholesteric liquid crystal film may separate circularly polarized light having either overlapping or non-overlapping wavelength ranges.

For example, one layer of cholesteric liquid crystal film separates circularly polarized light having the wavelength ranging from 450 nm to 550 nm, another layer separates circularly polarized light having the wavelength ranging from 550 nm to 700 nm, or separates circularly polarized light having the wavelength ranging from 500 nm to 700 nm.

In one embodiment of the present invention, the wavelength range of light separated by different layers of cholesteric liquid crystal film can be varied or combined arbitrarily, as long as the selective reflection wavelength range finally covers the wavelength range of visible light. In one embodiment, there is at least one layer of the cholesteric liquid crystal film which is able to separate the left circular polarized light of the wavelength range from 450 nm to 700 nm.

In one embodiment of the present invention, the optical adhesive has the refractive index of 1.3 to 1.8, the thickness of 10 to 50 μm, and its transmittance is at least higher than 85%. The optical adhesive is one selected from acrylic resin, unsaturated polyester, polyurethane, epoxy resin and a mixture thereof.

In one embodiment of the present invention, the quarter-wavelength retardation plate (QWP) in conjunction with the cholesteric liquid crystal film are used to convert a circular polarized light into a linear polarized light, so as to increase off-axis color. The QWP can be characterized as a wide-band QWP or a narrow-band QWP. It may be a single-layer film or the film comprising a plurality of layers of retardation films so as to from a quarter-wavelength retardation plate.

A single layer of cross-linked cholesteric liquid crystal polymer film can be fabricated by a conventional method. For example, a method disclosed in U.S. Pat. No. 5,691,789 can be employed, wherein after cholesteric liquid crystals having polymerizable functional groups and nematic liquid crystals that are not polymerizable are dissolved in a solvent, the prepared liquid crystal solution is coated on a substrate that have undergone aligning treatment through a conventional coating technique such as die coating, scraper coating and spin coating, then, the solvent is removed, and an UV light exposure process is performed. The phase separation occurs within the liquid crystal layer, i.e. cross-linked phase separated from non cross-linked phase such that the content ratio of these two phases is of non-linear distribution in the thickness direction, thereby controlling the helical pitch of the cholesteric liquid crystals. Alternatively, after the solvent is removed, the temperature is adjusted such as from about 60° C. to 150° C. so as to adjust the helical pitch to achieve desired wavelength range for separating polarized light. The substrate can also be removed if needed. Thus, a cholesteric liquid crystal polymer film is formed. It should be noted that the present invention is not limited to the above-mentioned method.

In the above-mentioned method, the solvent comprises, but is not limited to tetrahydrofuran (THF), toluene, cyclopentanone, ethanolamine (EA), N-methylpyrrolidone (NMP), acetone, or a combination thereof. In addition, an initiator such as a photoinitiator or a thermal initiator can be added. The photoinitiators may be such as Irgacure 184, Irgacure 369, Irgacure 907® (Ciba Geigy), and the thermal initiator may be AIBN (azobisisobutyronitrile), BPO (benzoyl peroxide), etc. In a preferred embodiment, the weight percent (wt %) of the initiator in the cholesteric liquid crystals having polymerizable functional groups ranges from 0.1 wt. % to 5 wt. %, the weight percent (wt %) of the cholesteric liquid crystals having polymerizable functional groups in the whole solution ranges from 5 wt. % to 50 wt. %, and the concentration of the solvent in the whole solution ranges from 45 wt. % to 94 wt. %.

The aforementioned steps can be repeated to fabricate one or multiple kinds of cholesteric liquid crystal layers made of a same liquid crystal material or different liquid crystal materials. The cholesteric liquid crystal layers are then bound together via an optical adhesive so as to form a laminated cholesteric liquid crystal film. Finally, a quarter-wavelength retardation plate is bound to a surface of the laminated cholesteric liquid crystal film via the optical adhesive so as to obtain an optical film comprising the laminated cholesteric liquid crystal film. For example, the optical film comprises 2 to 5 or more cholesteric liquid crystal layers of the cholesteric liquid crystal film, wherein there is at least one layer of "wide-range" cholesteric liquid crystal layer, namely, its reflection wavelength (or the polarized separated wavelength range) covers the main wavelength range of visible light of three primary colors of red, green and blue. The film may be made of a single cholesteric liquid crystal layer or made of a plurality of layers of cholesteric liquid crystals, as long as the reflection wavelength range contributed by each layer can be combined to cover the wavelength range of visible light of three primary colors of red, green and blue.

Example 1

Preparing a "Wide-range" Cholesteric Liquid Crystal Layer 1-1 Preparing a Single Layer Film Reactive cholesteric liquid crystals of 90032 (Wacker) and nematic liquid crystals of E7 (Merck) are mixed in a ratio 2:1. After a photoinitiator IG184 0.6% is added, the mixture is filled into a empty test cell of 10 μm cell gap. The cholesteric liquid crystal cell is then exposed to UV light with intensity of 100 uW/cm2 at 92° C. for 15 minutes for solidification. Its selective reflection wavelength range is 400 to 700 nm measured by a Perkin-Elymer UV/VIS, and the film thickness is 10 μm.

1-2 Preparing Multi-Layer Films 1-2-1 Continuous Coating Method

By using a spin-coating machine, a solution with 30 wt % of cholesteric liquid crystals HELISOL® 0142R is added with 1% of an initiator I-907 and coated on a glass substrate that has undergone annealing treatment. The solvent is removed at 90° C. Then, the coating layer is exposed to UV light at 105° C. and the spinning speed is well controlled so as to obtain a first cholesteric liquid crystal layer with a thickness between 2 to 10 μm with its reflection wavelength covering the range of blue light. Next, another prepared solution of HELISOL® 0250 added with 1% of the initiator I-907 is continuously coated on surface of the first layer. The solvent is removed at 90° C. Then the coating layer is exposed to UV light at 105° C. so as to obtain a two-layer cholesteric liquid crystal film with its selective reflection wavelength covering the range of blue light and green light range. Finally, the prepared solution of HELISOL® 0359R added with 1% of the initiator I-907 is coated on the previous two-layer cholesteric liquid crystal film. The solvent is removed at 90° C. Then the coating layer is exposed to UV light at 105° C. so as to obtain a three-layer cholesteric liquid crystal film with its selective reflection wavelength covering the range of visible light of three primary colors of red, green and blue. Its polarized separated wavelength thereof ranges from 400 nm to 700 nm. The maximum increase in brightness between viewing angle of 0 to 50 degrees is 1.53 times when comparing the film is in or is not in the back light module. The colors shift is measured by EZ-contrast160 (ELDIM). Compared with the original values, the maximum color shift at large viewing angle, range of 50~80 degrees is 0.030.

It should be noted that the continuous coating method is not limited to three layers. Those skilled in the art can easily change the number of coated layers (e.g., 2 or 5 layers) and the coating order (e.g. blue, red, and then green) as long as the reflection wavelength covers the visible light range.

1-2-2 Continuous Laminating Method

By using a spin-coating machine, a solution with 30 wt % of cholesteric liquid crystals HELISOL® 0142R added with 1% of an initiator I-907 is coated on a PET substrate that has undergone annealing treatment. The solvent is removed at 90° C. Then the coating layer is exposed to UV light at 105° C. so as to obtain a cholesteric liquid crystal film with a thickness ranging from 2 to 10 μm. Its reflection wavelength is in the region of blue light. Then, the above-mentioned procedures are performed again except HELISOL® 0250R is used, thereby obtaining a cholesteric liquid crystal film with the reflection wavelength covering the range of green light. Then, the above-mentioned procedures are performed again except HELISOL® 0359R is used, thereby obtaining a cholesteric liquid crystal film with the reflection wavelength covering the range of red light.

These three "narrow-range" cholesteric liquid crystal layers are sequentially laminated via an optical adhesive such that the reflection wavelength of the laminated films covers the wavelength range of visible light of three primary colors of red, green and blue. Its polarized separated wavelength ranges from 440 nm to 680 nm and the thickness ranges from 5 to 25 μm.

It should be noted that the continuous laminating method is not limited to only three layers. Those skilled in the art can easily change the number of coated layers (e.g., 2 or 5 layers) and the coating order (e.g. blue, red, and then green) as long as the reflection wavelength covers the range of visible light of three primary colors of red, green and blue.

Example 2

Preparing a "Narrow-range" Cholesteric Liquid Crystal Layer

By using a spin-coating machine, a solution of 30 wt % of cholesteric liquid crystals HELISOL® 0250R and 1% of an initiator I-907 is coated on a PET substrate that has undergone annealing treatment. The solvent is removed at 90° C. Then the coating layer is exposed to UV light at 105° C., thereby obtaining a cholesteric liquid crystal film with a thickness of 2~10 μm Its reflection wavelength is in the range of green light.

Those who are skilled in the art can utilize the same method but different liquid crystal material or different process conditions to form cholesteric liquid crystal layers with reflection wavelength in the range of other colors. For example, by replacing the cholesteric liquid crystal solution with HELISOL® 0359R, under the same conditions the final product is a cholesteric liquid crystal film with the reflection wavelength in the range of red light.

Example 3

Preparing a Multi-functional Optical Film of the Present Invention 3-1 The Structure Having Two Layers of Cholesteric Liquid Crystal Layers
3-1-1 The Structure Having Two Layers of Wide-Range Cholesteric Liquid Crystal Layers Two single layer films obtained through Example 1-2-1 are bound together via an optical adhesive. The optical adhesive is purchased from Sokan Chemical (acrylic glue series, with the refractive index ranging from 1.3 to 1.65), and the adhesive has a thickness of 25 μm. Next, a substrate is removed so as to expose a surface of the laminated cholesteric liquid crystal film. Further, a quarter-wavelength retardation plate (Tejin Chemical, TT/S/W series) is bound thereto, thereby obtaining an optical film of the present embodiment.

Figure 2A:
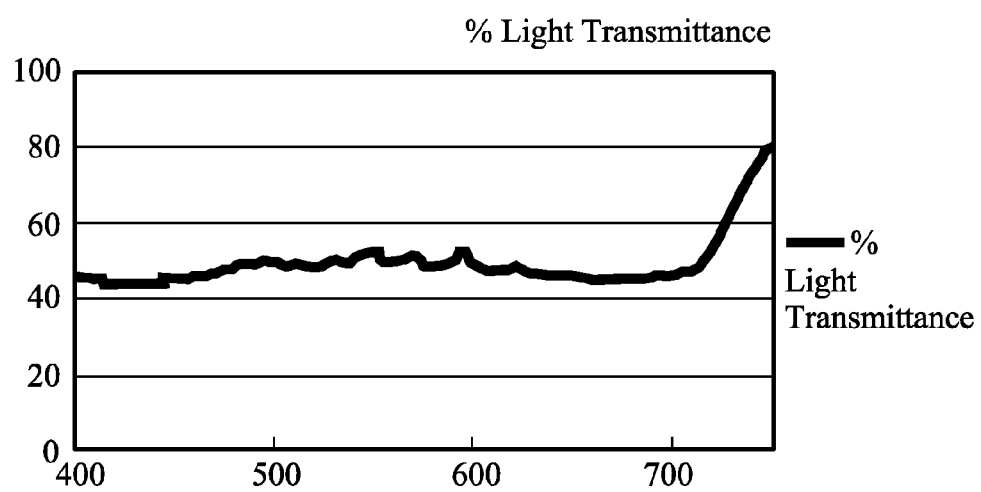
FIG. 2A is an UV/Vis spectrogram of an optical film having two layers of the cholesteric liquid crystal film made of a same material according to the present invention.

The polarized separated wavelength range is measured by an UV/Vis spectrometer (Perkin-Elymer Lamda-900 equipped with a polarized light measuring package) and the result is shown in FIG. 2A.

Figure 2B:
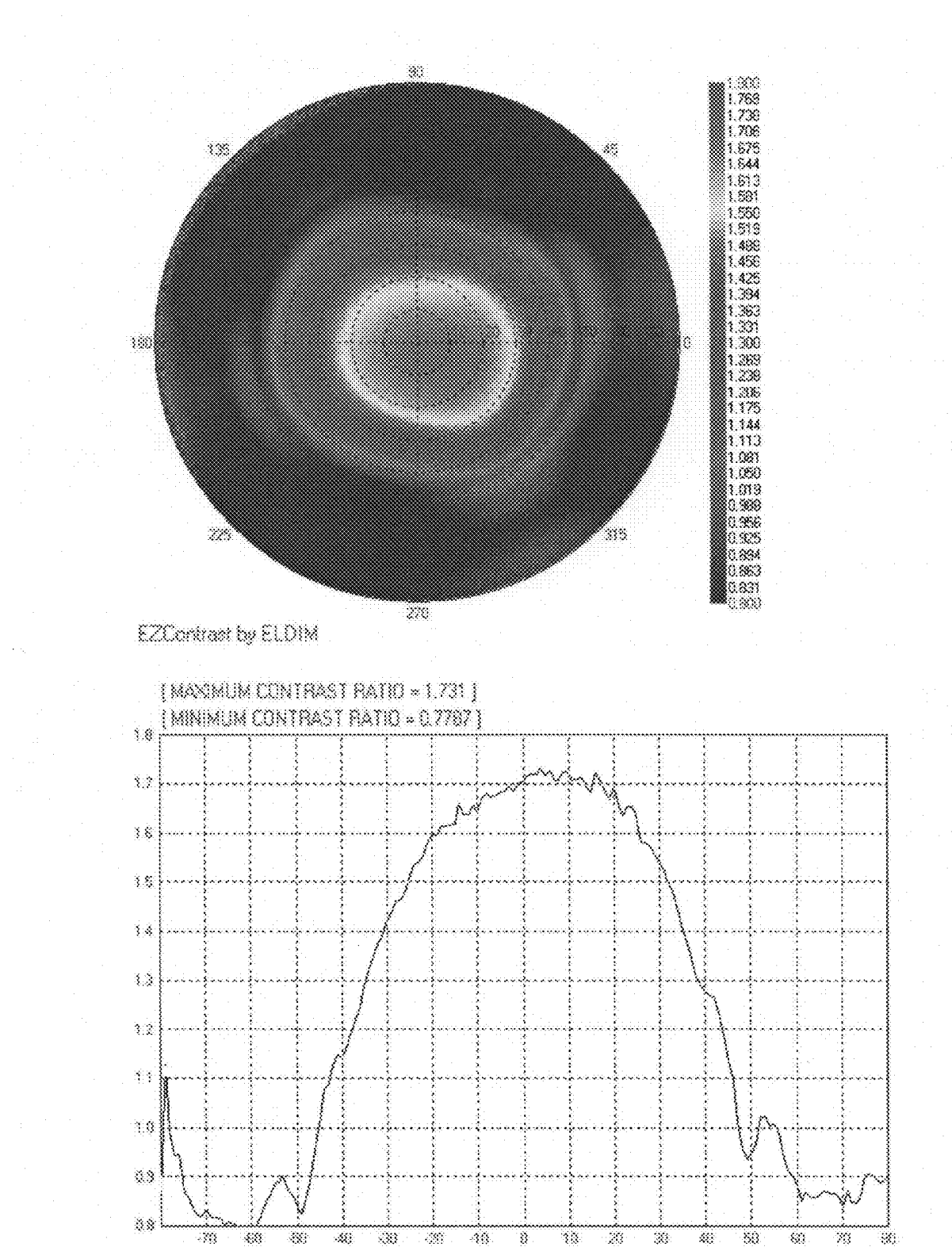
FIG. 2B is a brightness distribution diagram of an optical film having two layers of the cholesteric liquid crystal film made of a same material according to the present invention.
Figure 2C:
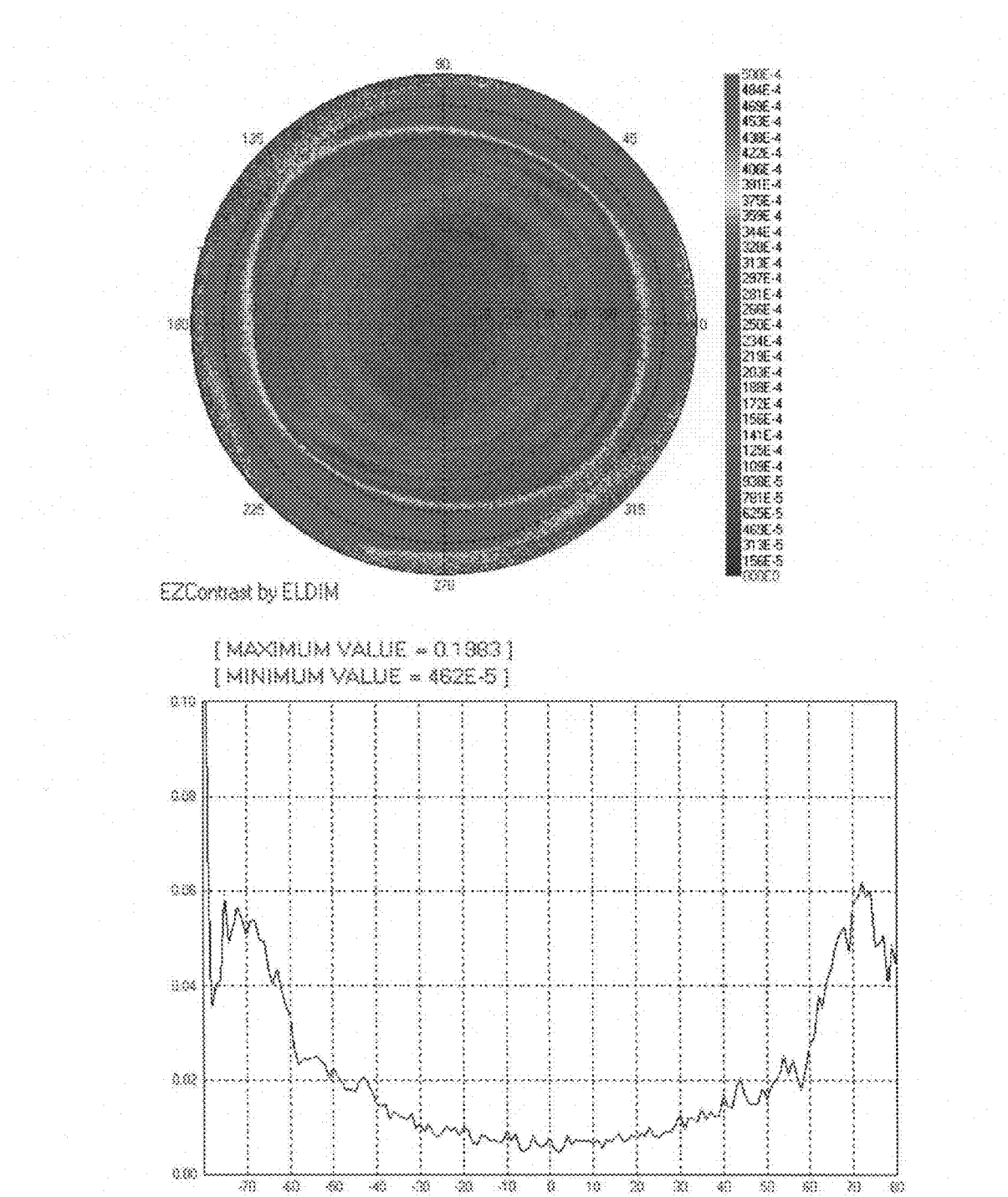
FIG. 2C is a color dispersion diagram of an optical film having two layers of the cholesteric liquid crystal film made of a same material according to the present invention.

The method for measuring the collimating effect and off-axis color effect are described as follows. The brightness value is defined to 1.0 when a back light module is only covered with a polarizer, and it was recognized as the original value. The corresponding chromaticity is also set as original values, i.e. the color shift du'v'=0.0. After these blank original values are measured, the optical film of the present invention is inserted between the back light module and the polarizer and the collimating effect is measured by taking the brightness values at different viewing angles by the EZ-contrast160 (ELDIM), and compared with the original values. The results are shown in FIG. 2B. Therein, the maximum gain of the brightness between 0~50 degrees is 1.731, which is larger than 1.53 of the comparison film structure having only one layer of cholesteric liquid crystal layer of Example 1-2-1. The maximum color shift at 50~80 degrees is 0.060 when measured by EZ-contrast160 (ELDIM). The color shift of comparison example of Example 1-2-1 is only 0.030.

3-1-2 The Structure Having Narrow-Range and Wide-Range Cholesteric Liquid Crystal Layers A "wide-range" cholesteric liquid crystal layer of Example 1-2-1 and a "narrow-range" cholesteric liquid crystal layer of Example 2 are bound together via an optical adhesive. Next, a substrate is removed so as to expose the cholesteric liquid crystal film. The optical adhesive is purchased from Sokan Chemical (acrylic glue series), and the adhesive has a thickness of 25 μm. Then, a quarter-wavelength retardation plate (Tejin Chemical, TT/S/W series) is bound to the cholesteric liquid crystal film, thereby forming an optical film of the present embodiment. The effects of the optical film are set forth by the following experimental results.

Figure 3A:
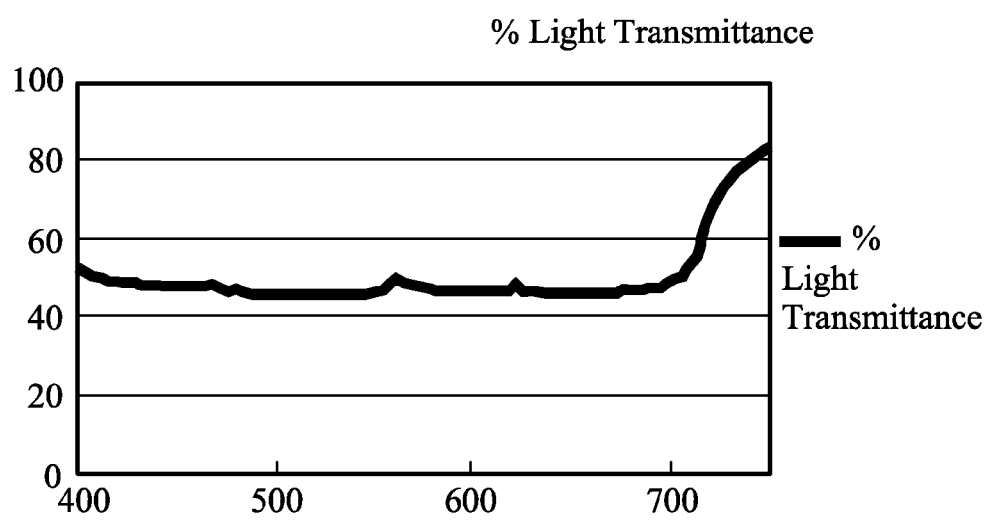
FIG. 3A is an UV/Vis spectrogram of an optical film having two layers of the cholesteric liquid crystal film made of different materials according to the present invention, wherein the "wide-range" cholesteric liquid crystal layer is disposed near the light source.
Figure 3B:
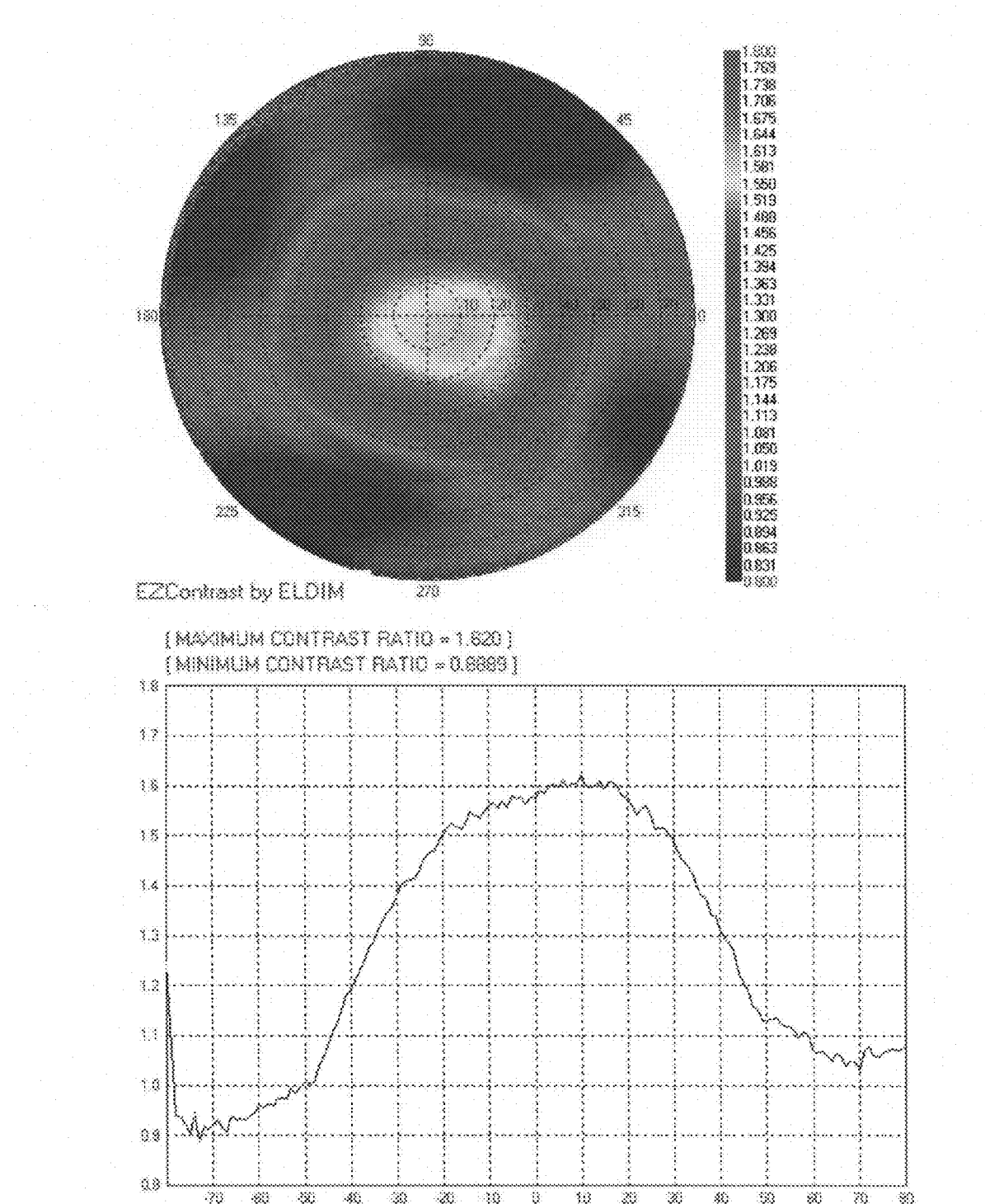
FIG. 3B is a brightness distribution diagram of an optical film having two layers of the cholesteric liquid crystal film made of different materials according to the present invention.
Figure 3C:
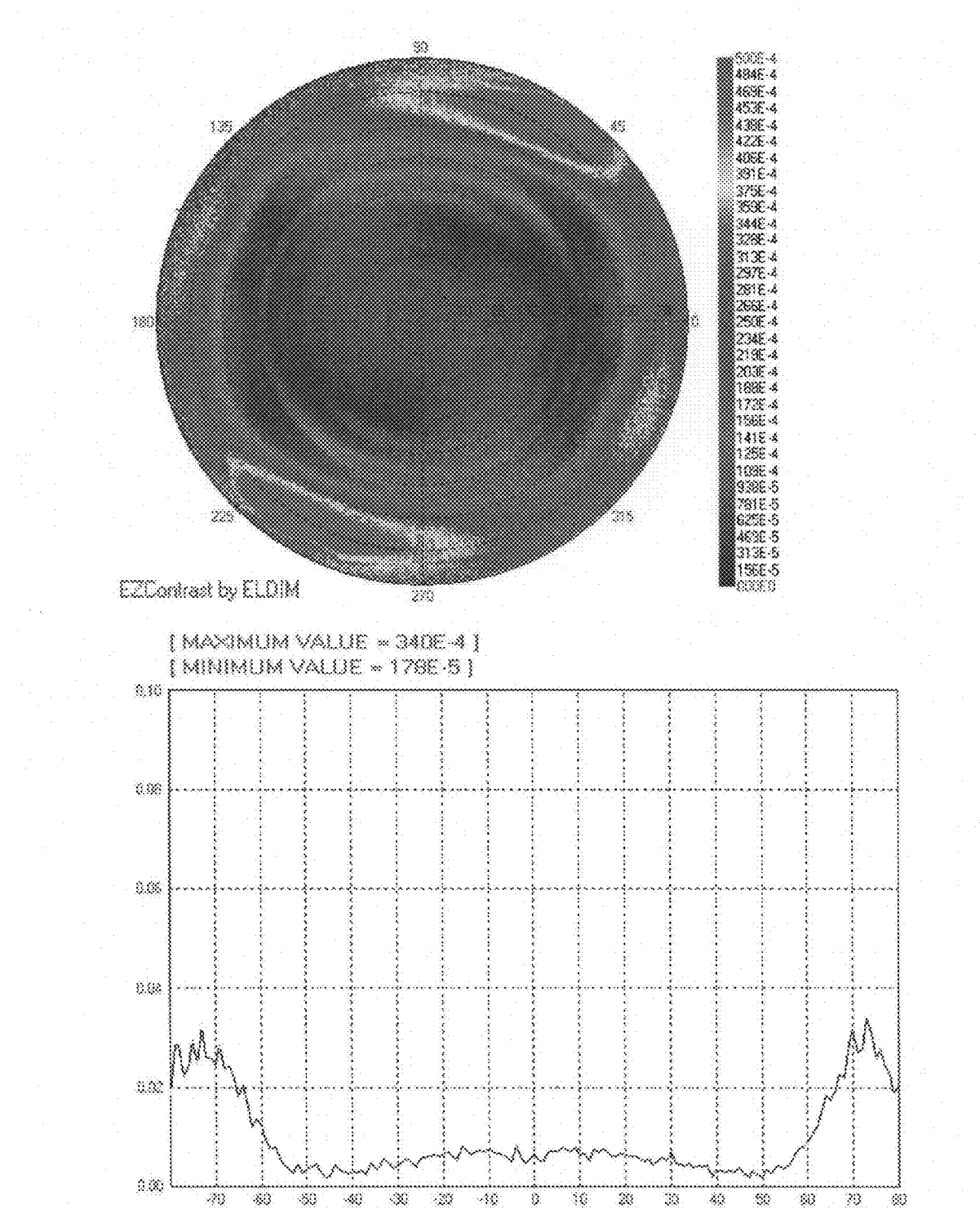
FIG. 3C is a color dispersion diagram of an optical film having two layers of the cholesteric liquid crystal film made of different materials according to the present invention.

3-1-2-1: The "narrow-range" cholesteric liquid crystal layer is disposed far from the light source, while the "wide-range" cholesteric liquid crystal layer is disposed near the light source. FIGS. 3A to 3C show the separated polarized wavelength, collimating effect, and color shift at large viewing angles. As shown in FIG. 3B, the maximum increase in brightness at 0 to 50 degrees is 1.62 times. The maximum color shift at 50~80 degrees is 0.034 when measured by EZ-contrast160 (ELDIM), as shown in FIG. 3C.

Figure 4A:
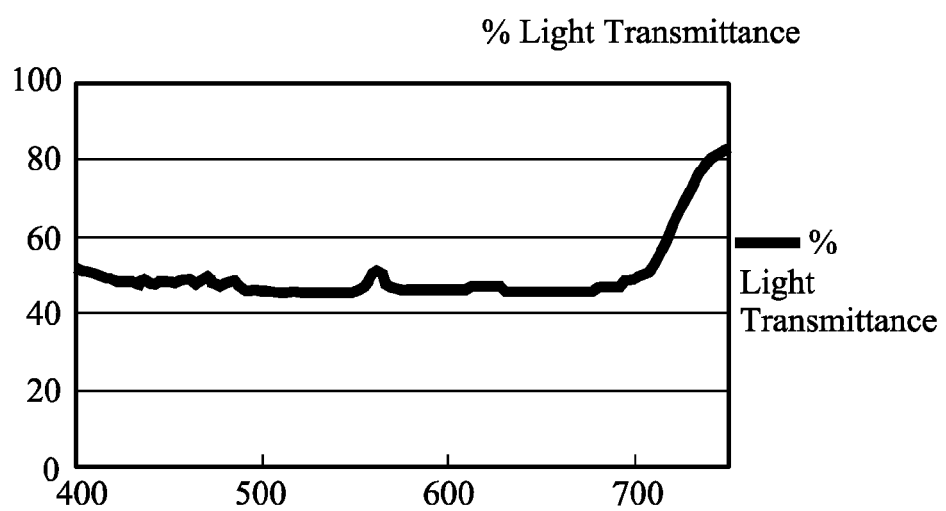
FIG. 4A is an UV/Vis spectrogram of an optical film having two layers of the cholesteric liquid crystal film made of different materials according to the present invention, wherein the "narrow-range" cholesteric liquid crystal layer is disposed near the light source.
Figure 4B:
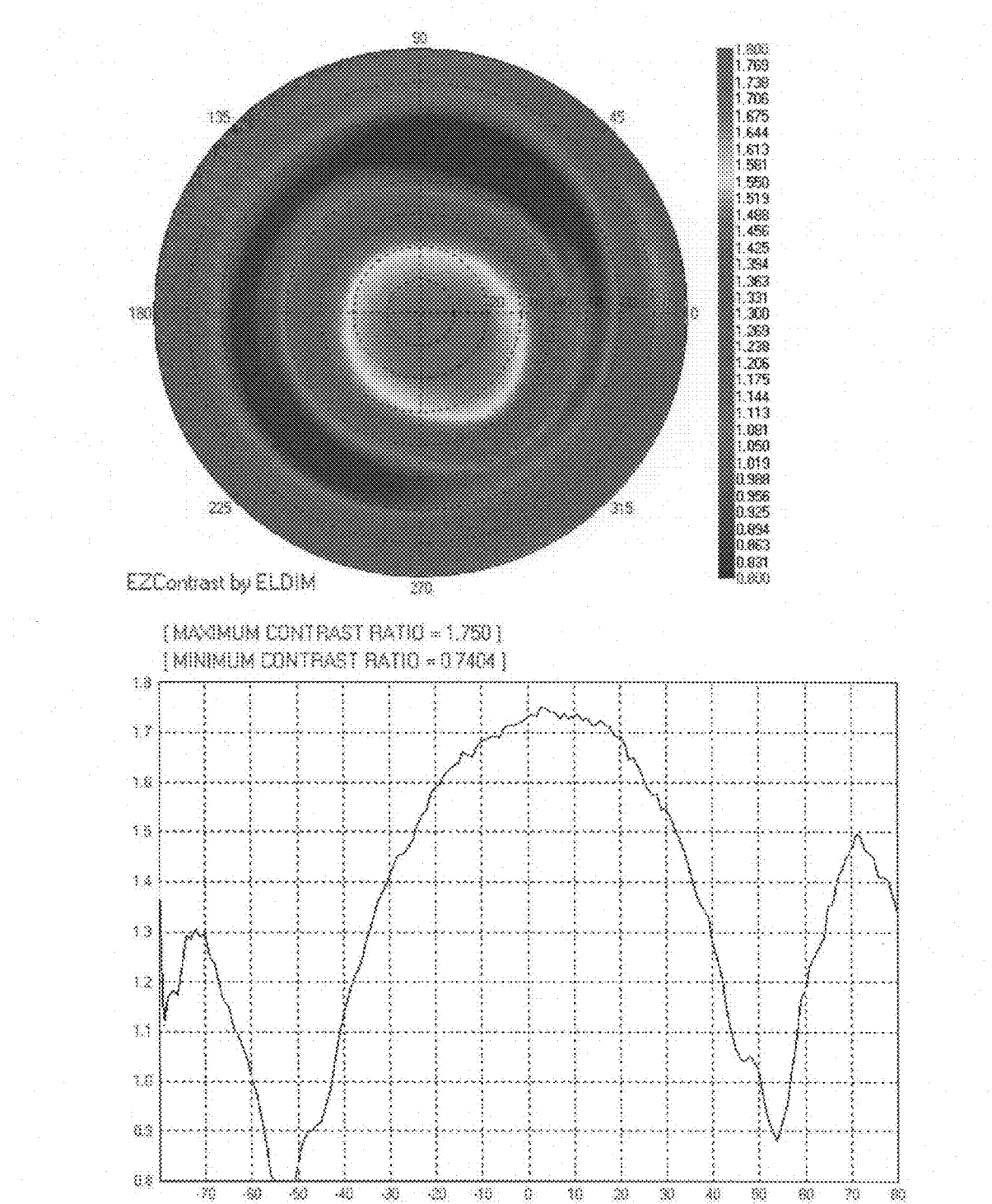
FIG. 4B is a brightness distribution diagram of an optical film having two layers of the cholesteric liquid crystal film made of different materials according to the present invention.
Figure 4C:
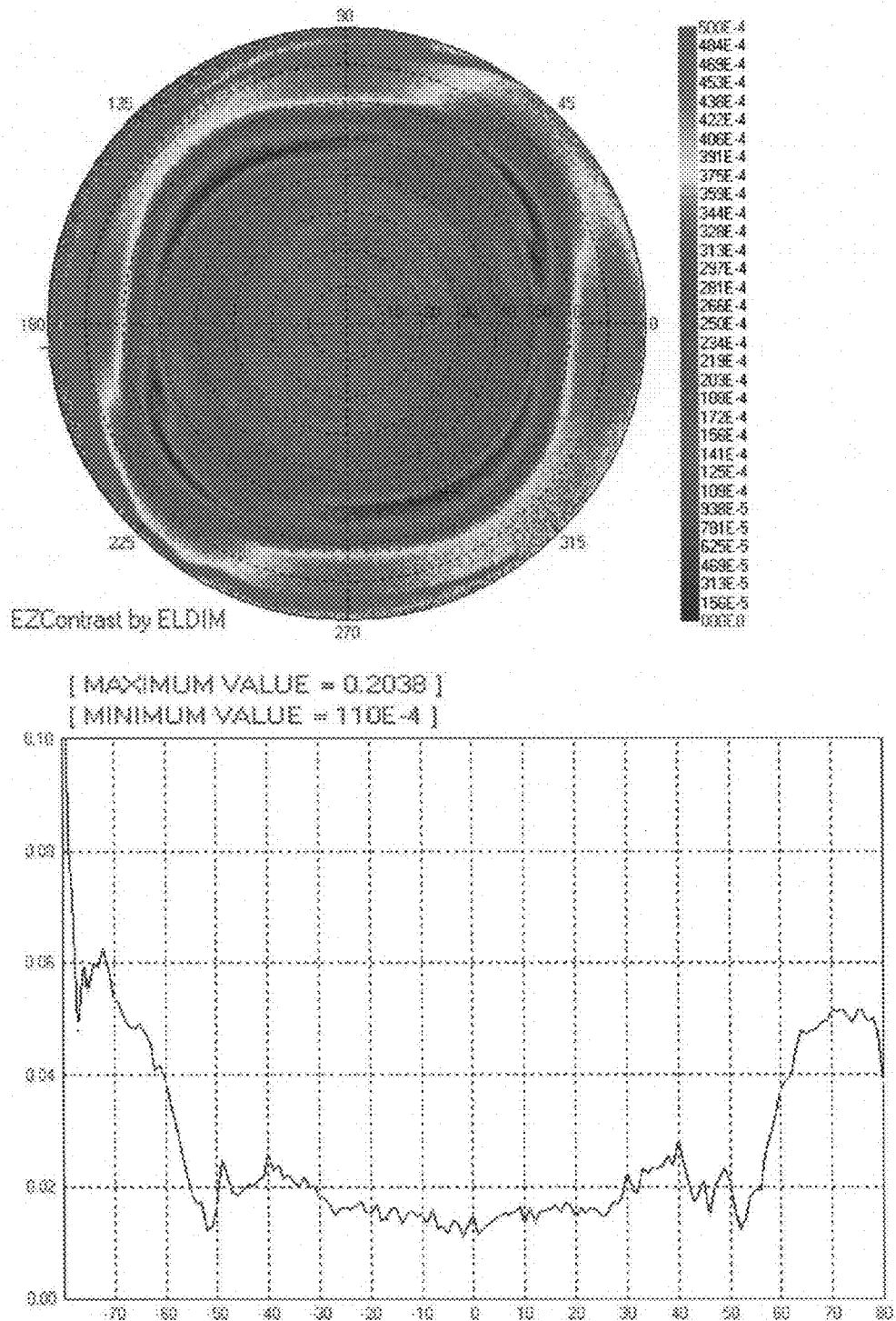
FIG. 4C is a color dispersion diagram of an optical film having two layers of the cholesteric liquid crystal film made of different materials according to the present invention.

3-1-2-2: The "wide-range" cholesteric liquid crystal layer is disposed far from the light source, while the "narrow-range" cholesteric liquid crystal layer is disposed near the light source. FIGS. 4A to 4C show the polarized separated wavelength range, collimating effect, and color shift at large viewing angles. As shown in FIG. 4B, the maximum increase in brightness at 0~50 degrees is 1.62 times. The maximum color shift at 50~80 degrees is 0.060 when measured by EZ-contrast160 (ELDIM)., as shown in FIG. 4C.

Figure 5A:
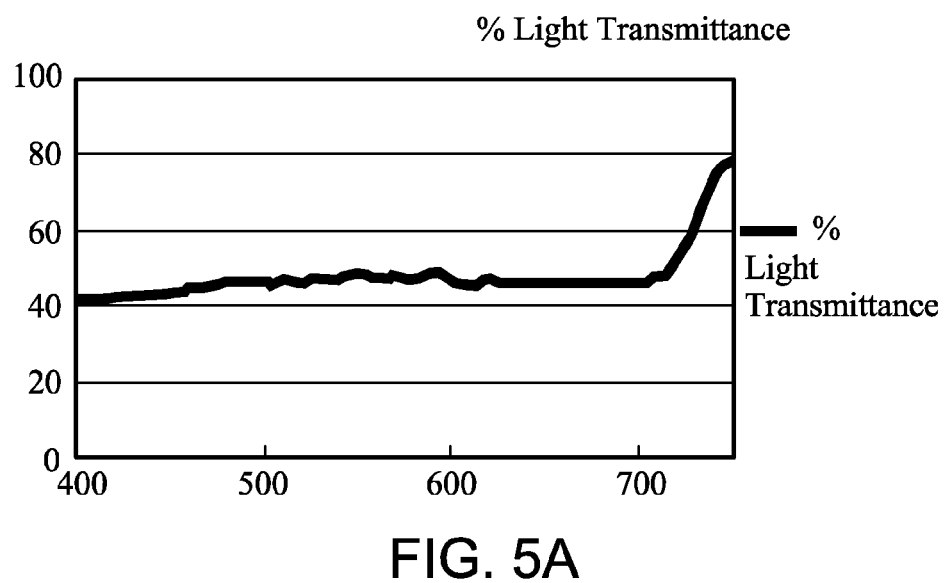
FIG. 5A is an UV/Vis spectrogram of an optical film having three layers of the cholesteric liquid crystal film made of a same material according to the present invention.
Figure 5B:
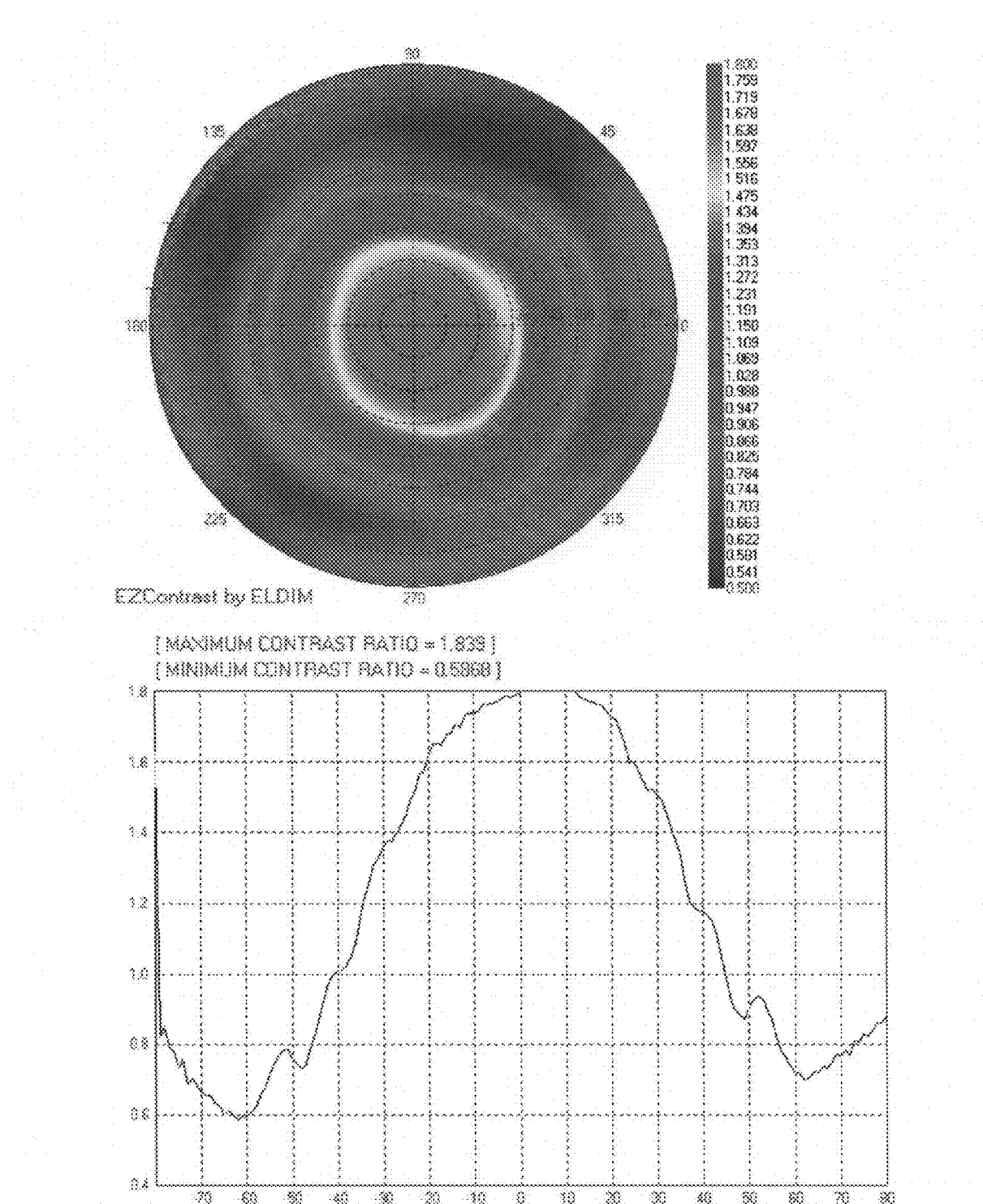
FIG. 5B is a brightness distribution diagram of an optical film having three layers of the cholesteric liquid crystal film made of a same material according to the present invention.
Figure 5C:
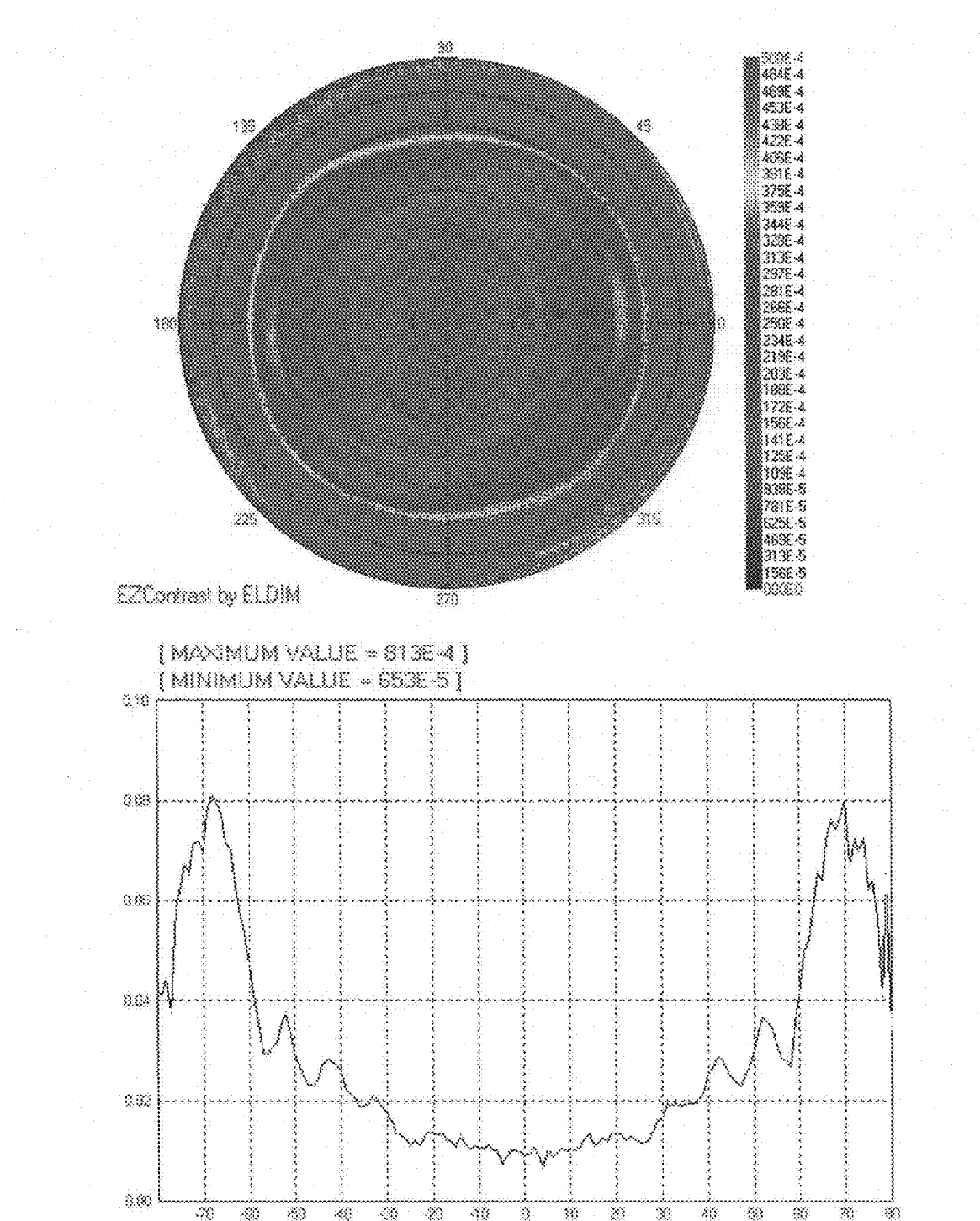
FIG. 5C is a color dispersion diagram of an optical film having three layers of the cholesteric liquid crystal film made of a same material according to the present invention.

3-2 The Structure Having More than Two Layers of Cholesteric Liquid Crystal Layers 3-2-1 The Structure Having Three Layers of "Wide-range" Cholesteric Liquid Crystal Layers A two-layer structure of Example 3-1-1 is further bound with a third wide-range cholesteric liquid crystal layer same as the films of the two-layer structure by using a same method, thereby obtaining an optical film having three layers of the cholesteric liquid crystal layers of Example 3-2-1. By using the same measuring method, the polarized separated wavelength range, collimating effect, and color shift are shown in FIGS. 5A to 5C. As shown in FIG. 5B, the maximum increase in brightness at 0~50 degrees is 1.839 times, which is larger than 1.53 times in the single-layer structure and 1.731 times in the two-layer structure. The maximum color shift at 50~80 degrees is 0.080 when measured by EZ-contrast160 (ELDIM) as shown in FIG. 5C, which is larger than 0.03 in the single-layer structure and 0.06 in the two-layer structure.

Figure 6A:
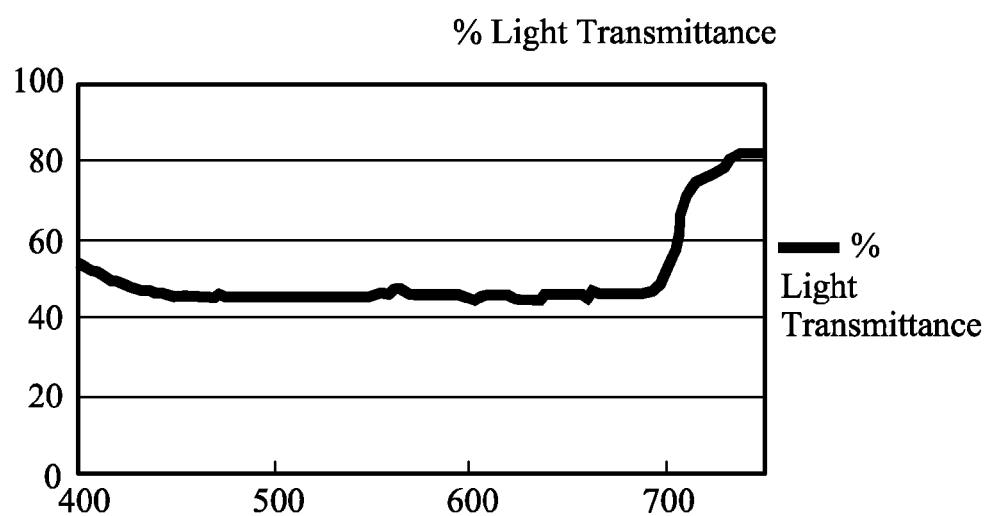
FIG. 6A is an UV/Vis spectrogram of an optical film having three layers of the cholesteric liquid crystal film according to the present invention, wherein two layers of the cholesteric liquid crystal film are made of a same material.
Figure 6B:
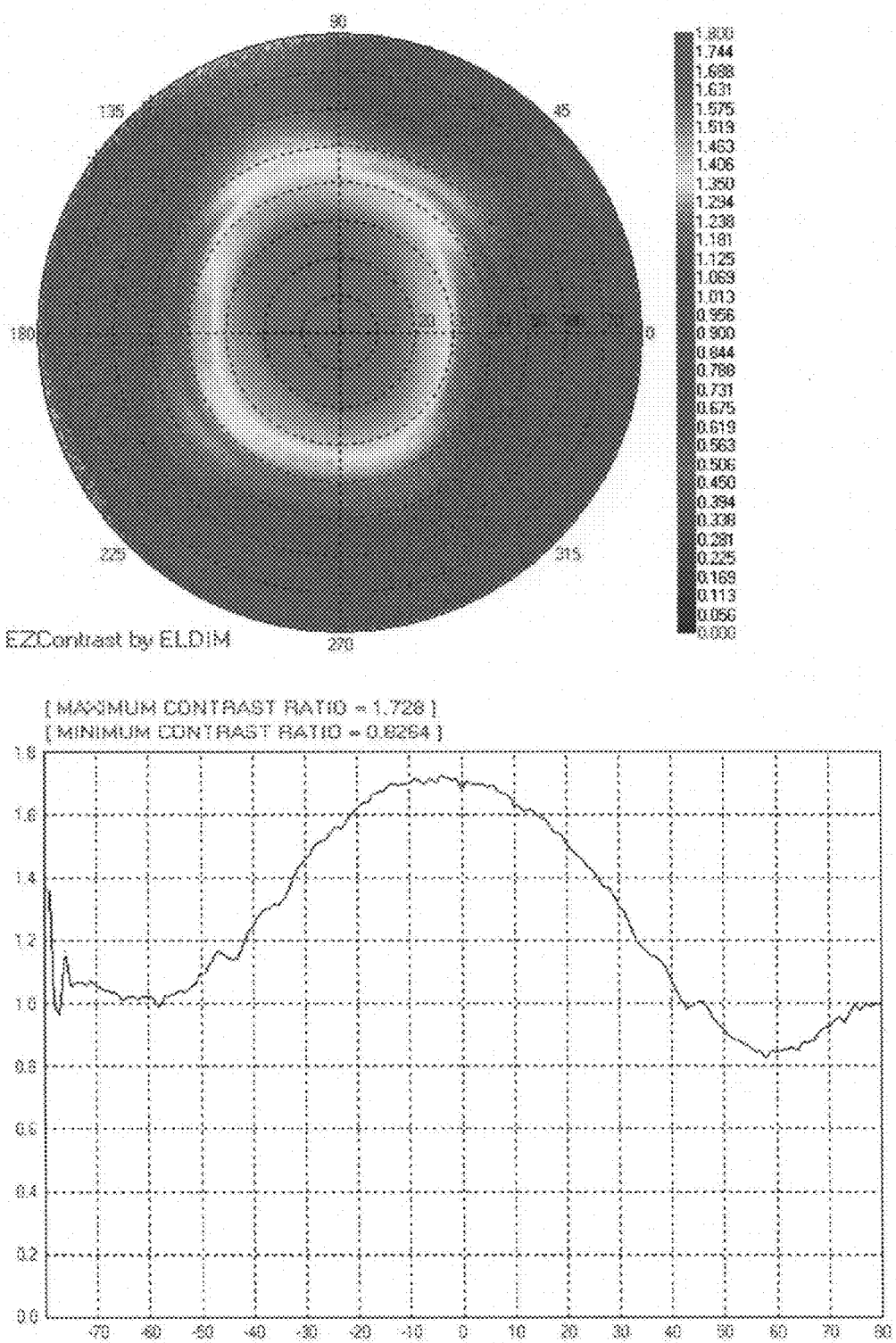
FIG. 6B is a brightness distribution diagram of an optical film having three layers of the cholesteric liquid crystal film according to the present invention, wherein two layers of the cholesteric liquid crystal film are made of a same material.
Figure 6C:
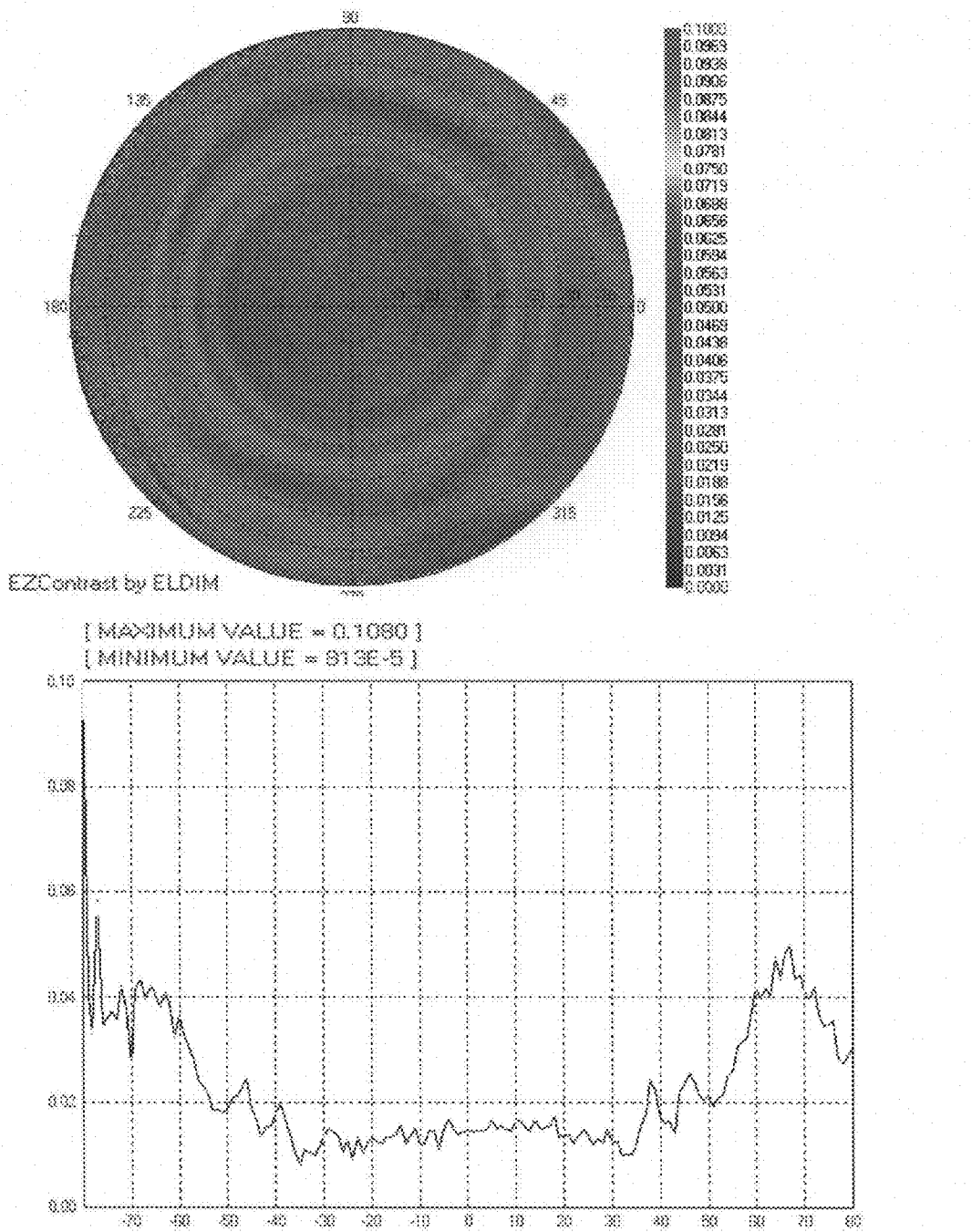
FIG. 6C is a color dispersion diagram of an optical film having three layers of the cholesteric liquid crystal film according to the present invention, wherein two layers of the cholesteric liquid crystal film are made of a same material.

3-2-2 The Structure Having Two Layers of "Wide-range" Cholesteric Lliquid Crystal Layers and One Layer of "Narrow-range" Cholesteric Liquid Crystal Layer 3-2-2-1 The two layers of "wide-range" cholesteric liquid crystal layers are disposed far from the light source, while the "narrow-range" cholesteric liquid crystal layer is disposed near the light source. FIGS. 6A to 6C show the polarized separated wavelength range, collimating effect, and color shift at large viewing angles. As shown in FIG. 6B, the maximum increase in brightness at 0~50 degrees is 1.728 times. The maximum color shift at 50~80 degrees is 0.050 when measured by EZ-contrast160 (ELDIM), as shown in FIG. 6C.

Figure 7A:
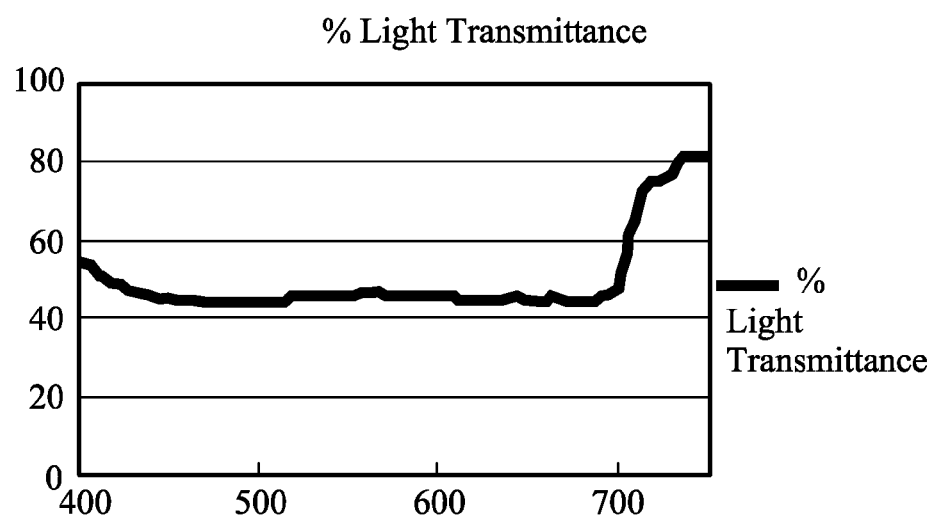
FIG. 7A is an UV/Vis spectrogram of an optical film having three layers of the cholesteric liquid crystal film according to the present invention, wherein two layers of the cholesteric liquid crystal film are made of a same material, with the "narrow-range" cholesteric liquid crystal layer disposed between the two layers.
Figure 7B:
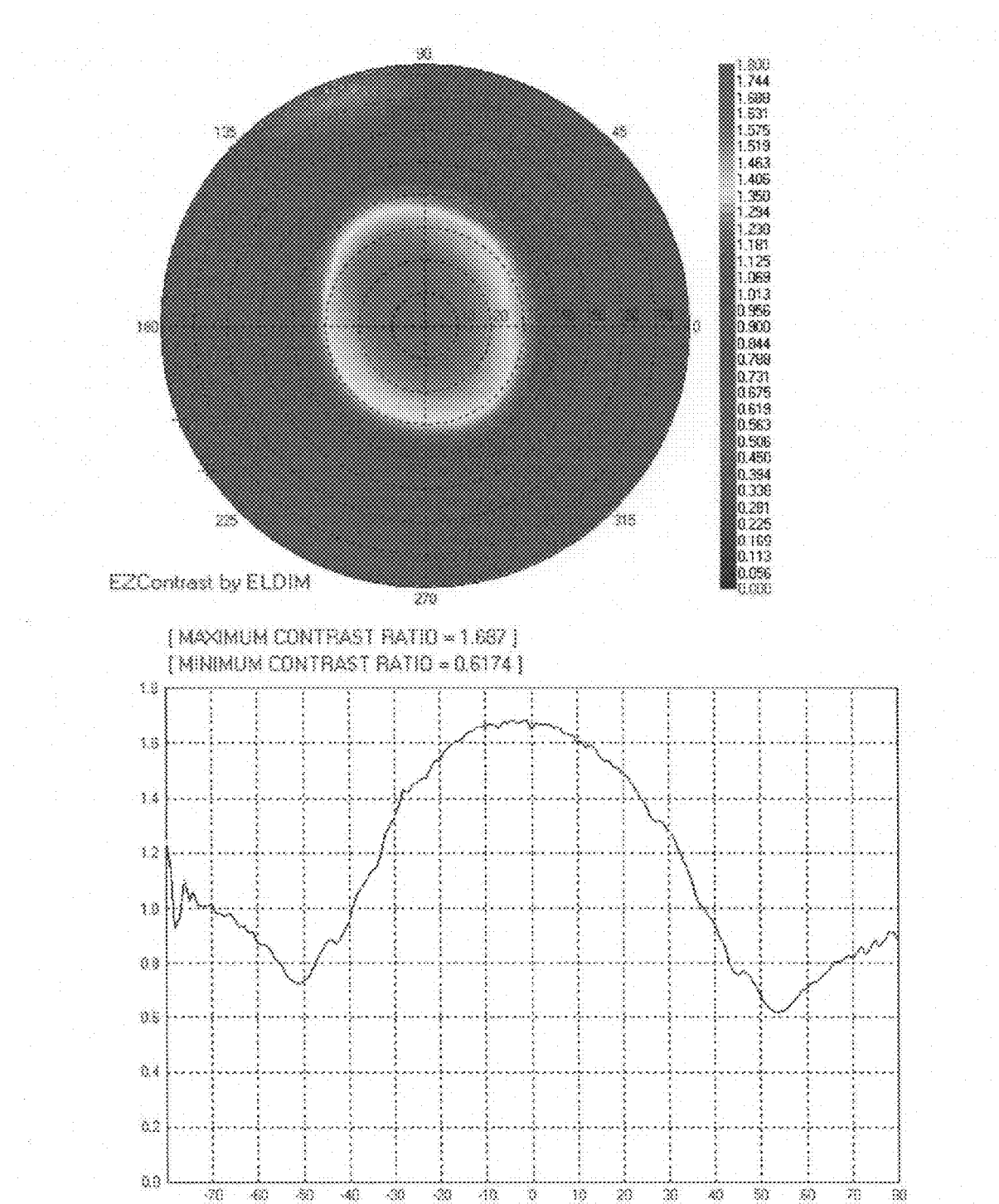
FIG. 7B is a brightness distribution diagram of the optical film of FIG. 7A.
Figure 7C:
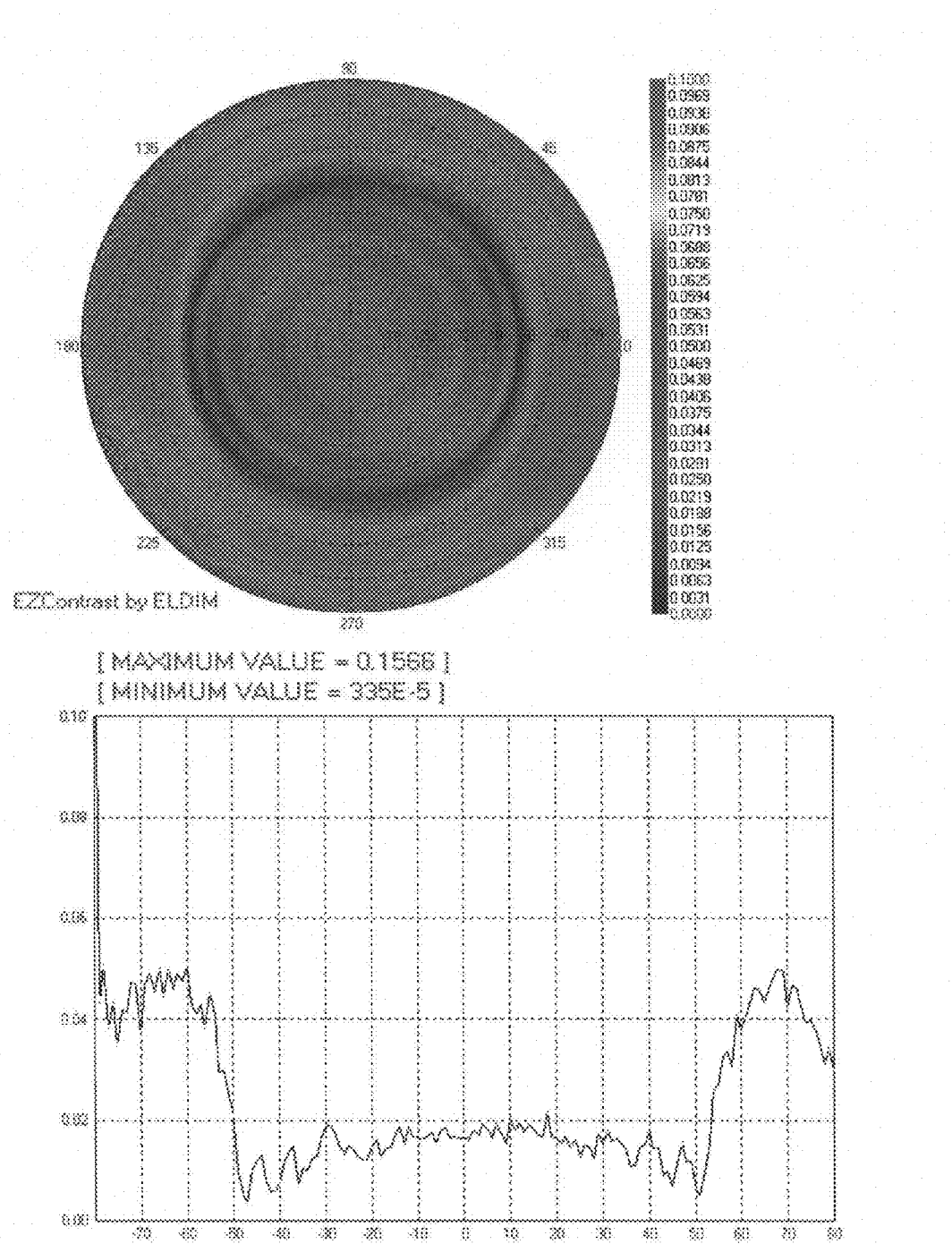
FIG. 7C is a color dispersion diagram of the optical film of FIG. 7A.

3-2-2-2 The two layers of "wide-range" cholesteric liquid crystal layers are disposed far from the light source and near the light source respectively, and the "narrow-range" cholesteric liquid crystal layer is disposed between the two layers of "wide-range" cholesteric liquid crystal layers. FIGS. 7A to 7C show the polarized separated wavelength range, collimating effect, and color shift at large viewing angles. As shown in FIG. 7B, the maximum increase in brightness at 0~50 degrees is 1.687 times. The maximum color shift at 50~80 degrees is 0.050 when measured by EZ-contrast160 (ELDIM), as shown in FIG. 7C.

Figure 8A:
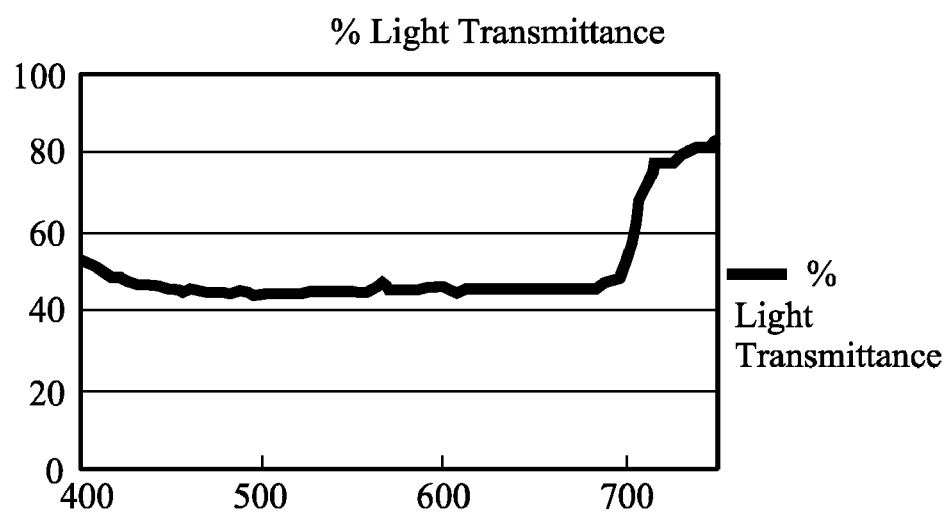
FIG. 8A is an UV/Vis spectrogram of an optical film having three layers of the cholesteric liquid crystal film according to the present invention, wherein two layers of the cholesteric liquid crystal film are made of a same material, with the a "narrow-range" cholesteric liquid crystal layer disposed far from the light source.
Figure 8B:
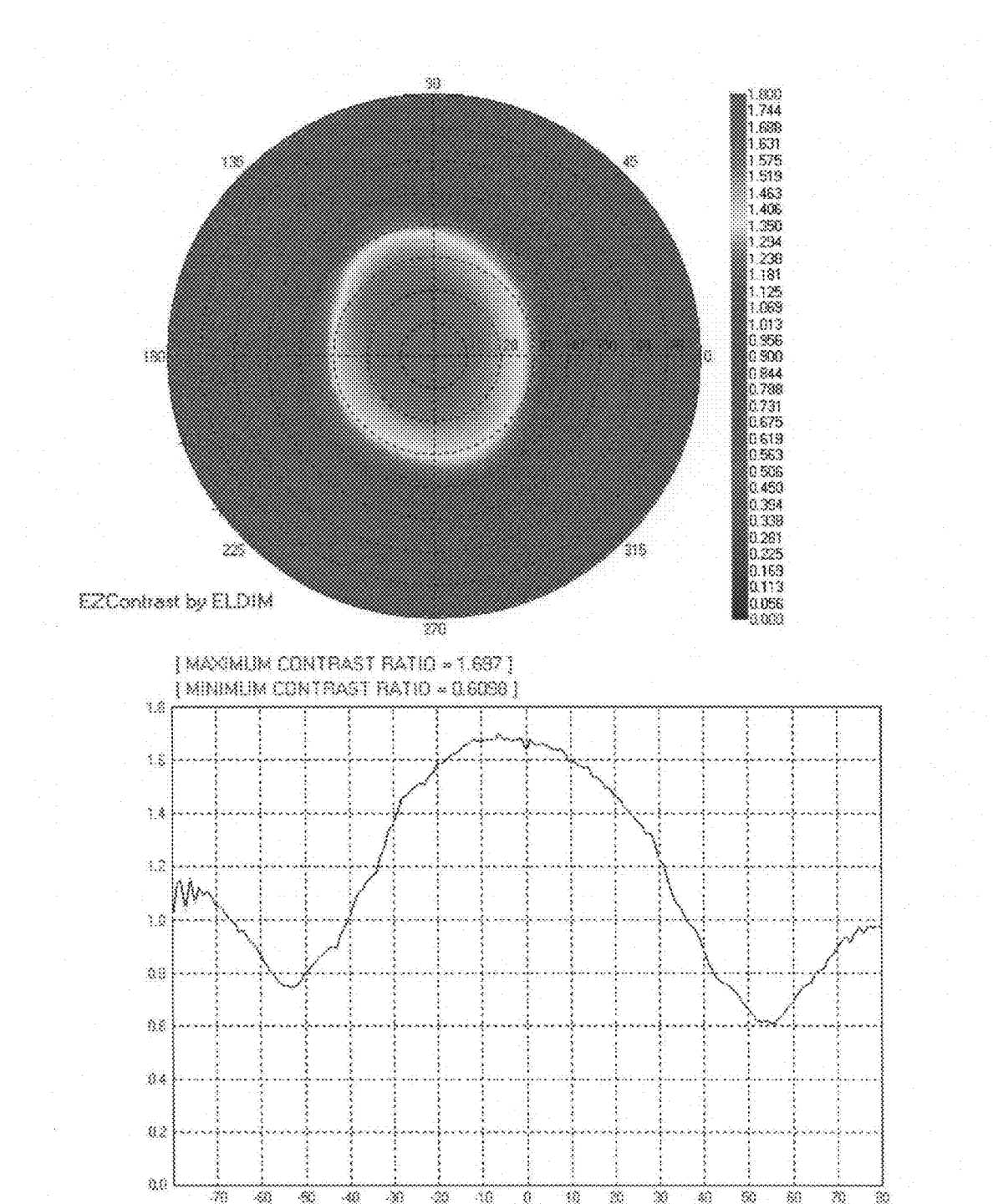
FIG. 8B is a brightness distribution diagram of the optical film of FIG. 8A.
Figure 8C:
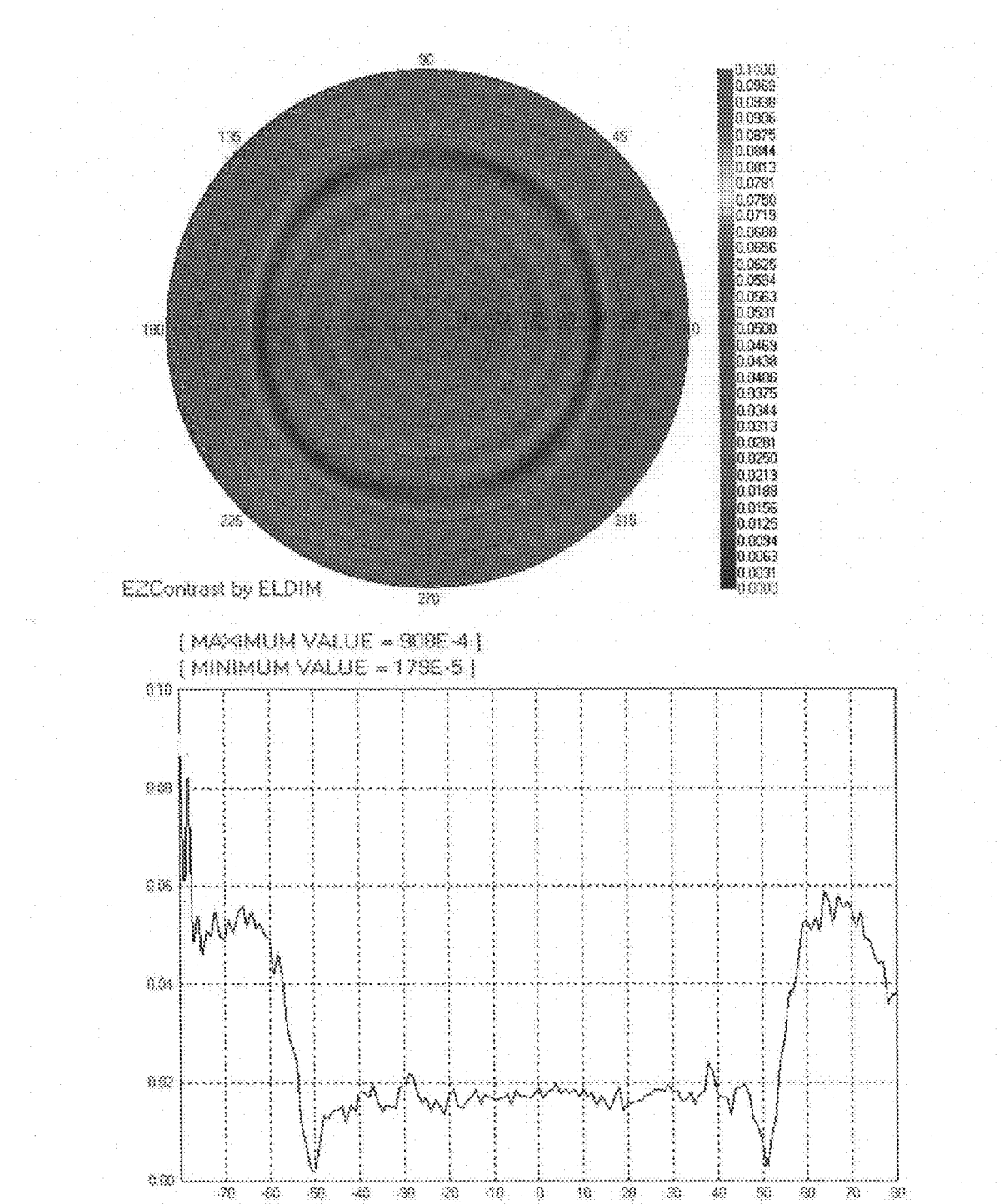
FIG. 8C is a color dispersion diagram of the optical film of FIG. 8A.

3-2-2-3 The "narrow-range" cholesteric liquid crystal layer is disposed far from the light source, while the two layers of the "wide-range" cholesteric liquid crystal layers are disposed near the light source. FIGS. 8A to 8C show the polarized separated wavelength range, collimating effect, and color shift at large viewing angles. As shown in FIG. 8B, the maximum increase in brightness at 0~50 degrees is 1.697 times. The maximum color shift at 50~80 degrees is 0.058 when measured by EZ-contrast160 (ELDIM), as shown in FIG. 8C.

Comparative Example 1

Preparing an Optical Film Made of Laminated Cholesteric Liquid Crystal Film According to the Prior Art By using a squeezing die, a first solution with 30 wt % of the first cholesteric liquid crystals HELISOL® 0142R added with 1% of a photoinitiator is coated on a substrate that has undergone aligning treatment. The solvent is removed at 90° C. Then the substrate is exposed to UV light at 125° C. so as to conduct cross-linking polymerization of the cholesteric liquid crystals for solidification. Next, by using the squeezing die, a second solution with 30 wt. % of cholesteric liquid crystals (HELISOL® 0142R: HELISOL® 0250R=1:1) is coated on the previously prepared cholesteric liquid crystal polymer film. The solvent is removed at 90° C. Then, the substrate is exposed to UV light at 120° C. so as to conduct cross-linking polymerization of the cholesteric liquid crystals for solidification. A third cholesteric liquid crystal solution (HELISOL® 0250R: HELISOL® 0359R=1:1) is further coated by the same method. The solvent is removed at 90° C. Then, the substrate is exposed to UV light at 120° C. so as to conduct cross-linking polymerization of the cholesteric liquid crystals for solidification, thereby obtaining a laminated cholesteric liquid crystal film that can separate left and right circularly polarized light in the visible light range.

Figure 9A:
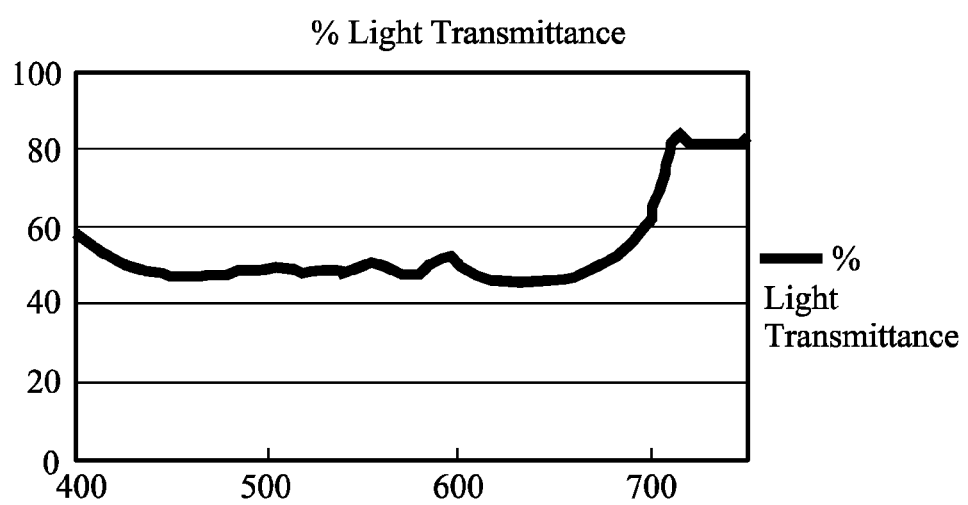
FIG. 9A is an UV/Vis spectrogram of an optical film according to the prior art.
Figure 9B:
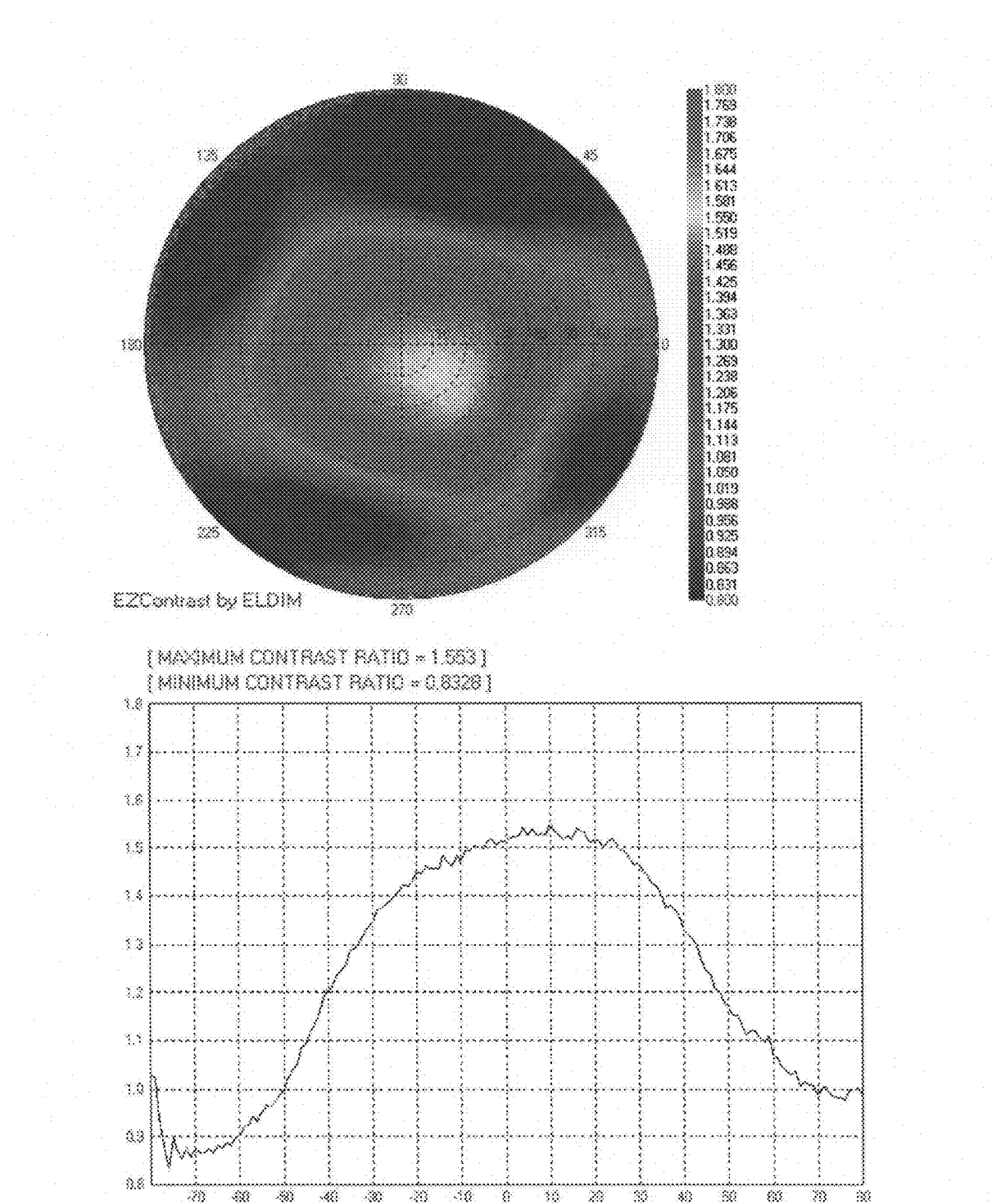
FIG. 9B is a brightness distribution diagram of an optical film according to the prior art.
Figure 9C:
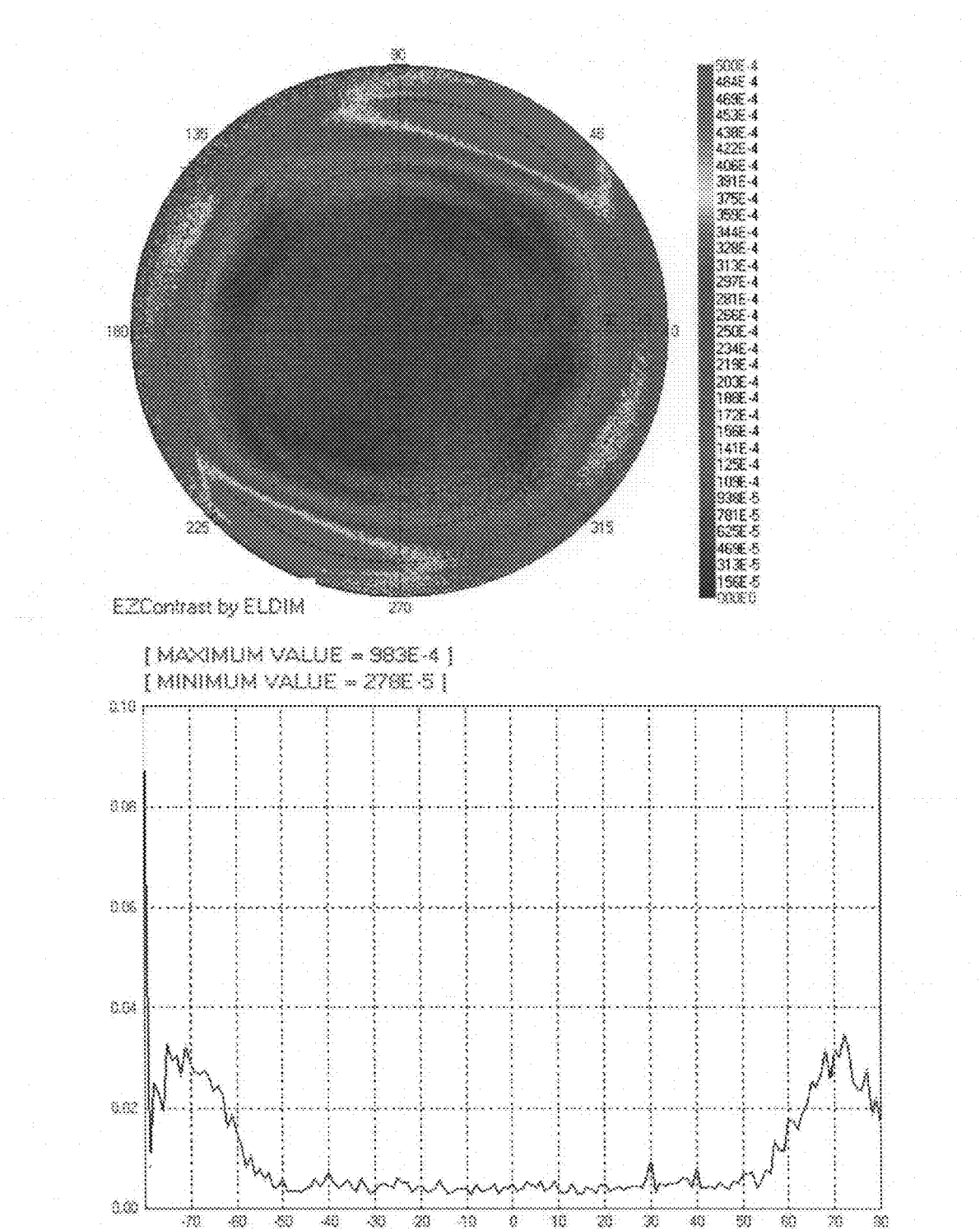
FIG. 9C is a color dispersion diagram of an optical film according to the prior art.

A quarter-wavelength retardation plate is bound to the laminated films via an optical adhesive. The optical adhesive is purchased from Sokan Chemical (acrylic glue series), and the adhesive has a thickness of 25 μm. Thus, an optical film is obtained. The measurement by an UV/Vis spectrometer is shown in FIG. 9A. The collimating effect at different viewing angles are measured by EZ-contrast (ELDIM) and the results are shown in FIG. 9B. The maximum increase in brightness at 0~50 degrees is 1.553 times (the method is as described in Example 3-1-1). The maximum color shift at 50~80 degrees is 0.033 when measured by EZ-contrast160 (ELDIM), as shown in FIG. 9C.

The results from the examples mentioned above and the comparative example are compared in Table 1. According to the experimental results, it can be found that the optical film having cholesteric liquid crystal multi-layer laminated film achieves the functions of light polarization, light collimating and limiting viewing angle

TABLE 1

| Sample No. | cholesteric liquid crystal layers | | | ¼-wavelength retardation plate | UV/Vis spectrum | Collimating factor | maximum color shift at 50~80° C. |
|---|---|---|---|---|---|---|---|
| | 1st layer | 2nd layer | 3rd layer | | | | |
| 3-1-1 | 1-2-1 | 1-2-1 | None | W159 | 400-700 nm | 1.731 | 0.060 |
| 3-1-2-1 | 1-2-1 | 2-1 | None | W159 | 400-700 nm | 1.62 | 0.034 |
| 3-1-2-2 | 2-1 | 1-2-1 | None | W159 | 400-700 nm | 1.75 | 0.060 |
| 3-2-1 | 1-2-1 | 1-2-1 | 1-2-1 | W159 | 400-700 nm | 1.839 | 0.080 |
| 3-2-2-1 | 1-2-1 | 1-2-1 | 2-1 | W159 | 400-700 nm | 1.728 | 0.050 |
| 3-2-2-2 | 1-2-1 | 2-1 | 1-2-1 | W159 | 400-700 nm | 1.687 | 0.050 |
| 3-2-2-3 | 2-1 | 1-2-1 | 1-2-1 | W159 | 400-700 nm | 1.697 | 0.058 |
| Comparative Example | 1-2-1 | None | None | W159 | 400-700 nm | 1.553 | 0.033 |
| *Blank Experiment | None | None | None | None | None | 1.0 | 0.0 |

*The blank experiment refers to the primitive structure of a back light module covered with a polarizer, which has neither the optical films of the present invention nor those of the comparative Example. Its brightness enhancement at different viewing angles is set to 1.0, while its color shift is set to 0.0.

The invention claimed is:

1. An optical film, comprising:
   a cholesteric liquid crystal film consisting of a plurality of cholesteric liquid crystal layers and having a first surface and a second surface opposed to the first surface;
   an optical adhesive formed between the cholesteric liquid crystal layers; and
   a quarter-wavelength retardation plate formed on the first surface of the cholesteric liquid crystal film, and bonded to the cholesteric liquid crystal film via the optical adhesive,
   wherein a first of the plurality of the cholesteric liquid crystal layers has selective reflection wavelength range that covers the wavelength range of visible light of three primary colors of red, green and blue, and a second of the plurality of the cholesteric liquid crystal layers has selective reflection wavelength range that substantially overlaps with the selective reflection wavelength range of the first cholesteric liquid crystal layer within the wavelength range of the visible light.

2. The optical film according to claim 1, further comprising a substrate bound to the second surface of the cholesteric liquid crystal film.

3. The optical film according to claim 1, wherein the cholesteric liquid crystal film consists of two to five of the cholesteric liquid crystal layers.

4. The optical film according to claim 1, wherein the cholesteric liquid crystal film separates circularly polarized light having the wavelength ranging from 400 nm to 750 nm.

5. The optical film according to claim 1, wherein the cholesteric liquid crystal film is made of nematic liquid crystals and chiral dopant.

6. The optical film according to claim 1, wherein the optical adhesive has a refractive index of 1.3 to 1.65, and a thickness of 10 to 50 μm.

7. The optical film according to claim 1, wherein the optical adhesive is made of one selected from the group consisting of acrylic resin, unsaturated polyester, polyurethane, epoxy resin, and a mixture thereof.

* * * * *